United States Patent
Payne

(10) Patent No.: US 8,703,064 B2
(45) Date of Patent: Apr. 22, 2014

(54) HYDROCABON CRACKING FURNACE WITH STEAM ADDITION TO LOWER MONO-NITROGEN OXIDE EMISSIONS

(75) Inventor: David C. Payne, Orange, TX (US)

(73) Assignee: WPT LLC, Houston, TX (US)

( * ) Notice: Subject to any disclaimer, the term of this patent is extended or adjusted under 35 U.S.C. 154(b) by 501 days.

(21) Appl. No.: 13/066,211

(22) Filed: Apr. 8, 2011

(65) Prior Publication Data

US 2012/0259147 A1    Oct. 11, 2012

(51) Int. Cl.
*B01J 19/00* (2006.01)
*C10G 9/00* (2006.01)
*C10G 9/20* (2006.01)
*F23C 6/04* (2006.01)
*F23C 5/08* (2006.01)

(52) U.S. Cl.
CPC ...... *C10G 9/206* (2013.01); *C10G 9/00* (2013.01); *F23C 6/045* (2013.01); *F23C 5/08* (2013.01); *C10G 2300/405* (2013.01); *C10G 2300/4056* (2013.01); *C10G 2300/1044* (2013.01); *C10G 2300/1081* (2013.01); *B01J 2219/00157* (2013.01); *F23C 2201/20* (2013.01); *F23C 2201/40* (2013.01)
USPC ............... 422/198; 422/182; 431/5; 208/106; 585/648; 585/613; 585/400; 110/348; 110/345

(58) Field of Classification Search
USPC ............... 422/198, 182; 110/348, 345; 431/5; 208/106, 48 Q; 585/648, 613, 400
See application file for complete search history.

(56) References Cited

U.S. PATENT DOCUMENTS

| | | | |
|---|---|---|---|
| 3,253,890 A | 5/1966 | DeLand et al. | |
| 3,804,579 A | 4/1974 | Wilhelm | |
| 3,907,488 A | 9/1975 | Takahashi et al. | |
| 4,152,108 A | 5/1979 | Reed et al. | |
| 4,394,118 A | 7/1983 | Martin | |
| 4,406,610 A | 9/1983 | Duijvestijn | |
| 4,533,314 A | 8/1985 | Herberling | |
| 4,614,490 A | 9/1986 | Kiczek et al. | |
| 4,755,371 A | 7/1988 | Dickerson | |
| 5,002,481 A | 3/1991 | Forster | |
| 5,095,693 A | 3/1992 | Day | |
| 5,098,282 A | 3/1992 | Schwartz et al. | |
| 5,154,596 A | 10/1992 | Schwartz et al. | |
| 5,158,443 A | 10/1992 | Miyake | |
| 5,180,302 A | 1/1993 | Schwartz et al. | |

(Continued)

FOREIGN PATENT DOCUMENTS

| | | |
|---|---|---|
| JP | 57031718 | 2/1982 |
| JP | 52061835 | 5/1997 |
| WO | WO 2008/056650 A1 | 5/2008 |

*Primary Examiner* — Lessanework Seifu
(74) *Attorney, Agent, or Firm* — Schultz & Associates, P.C.

(57) ABSTRACT

An apparatus and method is presented for reducing mono nitrogen oxide emissions in a hydrocarbon processing furnace. A preferred embodiment hydrocarbon cracking furnace includes a firebox with a set of wall burners and a set of floor burners, the floor burners comprising secondary burner tips burning a fuel-rich mixture and positioned below primary burner tips burning a fuel-lean mixture. A portion of flue gases are recirculated from the primary burner combustion area to the secondary burner combustion area and back to the primary burner combustion area. The floor burners further comprise a set of steam injection ports that inject steam into a conical flow to contact flames at the primary burner tips, reducing flame temperature and thereby reducing thermal NOx. The steam injection ports are positioned in the firebox above the primary burner tips.

39 Claims, 11 Drawing Sheets

(56) References Cited

U.S. PATENT DOCUMENTS

| | | |
|---|---|---|
| 5,195,884 A | 3/1993 | Schwartz et al. |
| 5,238,395 A | 8/1993 | Schwartz et al. |
| 5,269,678 A | 12/1993 | Schwartz et al. |
| 5,275,552 A | 1/1994 | Schwartz et al. |
| 5,285,628 A | 2/1994 | Korenberg |
| 5,344,307 A | 9/1994 | Schwartz et al. |
| 5,357,741 A | 10/1994 | Talabisco et al. |
| 5,361,578 A | 11/1994 | Donlan |
| 5,471,957 A | 12/1995 | Brady et al. |
| 5,601,424 A | 2/1997 | Bernstein et al. |
| 5,983,622 A | 11/1999 | Newburry et al. |
| 6,178,738 B1 | 1/2001 | Frutschi |
| 6,418,724 B1 | 7/2002 | Cheng |
| 6,434,945 B1 | 8/2002 | Mandai et al. |
| 6,548,036 B2 | 4/2003 | Iida et al. |
| 6,558,153 B2 | 5/2003 | Schutz et al. |
| 6,823,821 B2 | 11/2004 | Kayahara et al. |
| 6,869,277 B2 * | 3/2005 | Stephens ............... 431/9 |
| 6,983,605 B1 | 1/2006 | Hook et al. |
| 6,986,658 B2 | 1/2006 | Stephens et al. |
| 7,104,069 B2 | 9/2006 | Martling et al. |
| 7,514,062 B2 | 4/2009 | Kopietz et al. |
| 7,523,603 B2 | 4/2009 | Hagen et al. |
| 2005/0284347 A1 | 12/2005 | Forster et al. |
| 2007/0099141 A1 | 5/2007 | Joshi et al. |
| 2009/0020459 A1 | 1/2009 | De Haan et al. |

* cited by examiner

Plan View

Right Side Elevation

Left Side Elevation

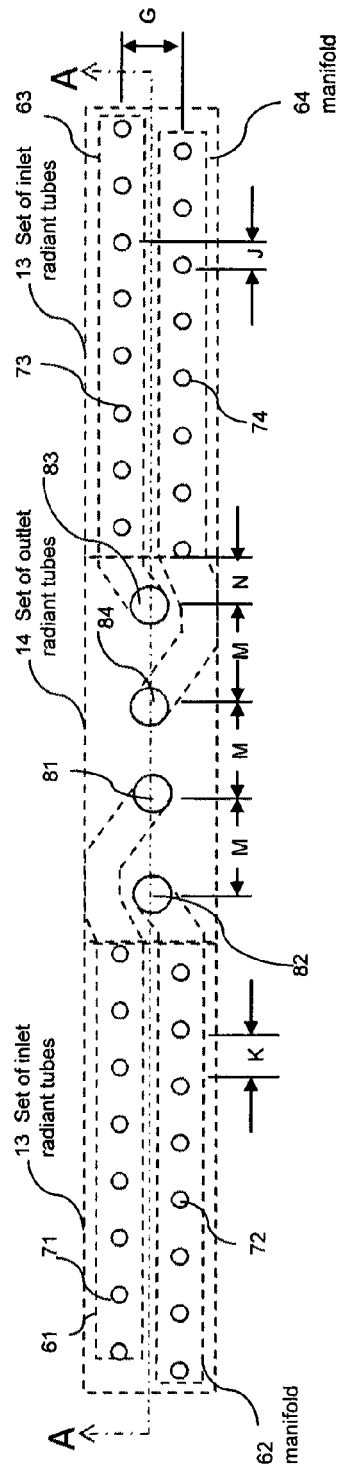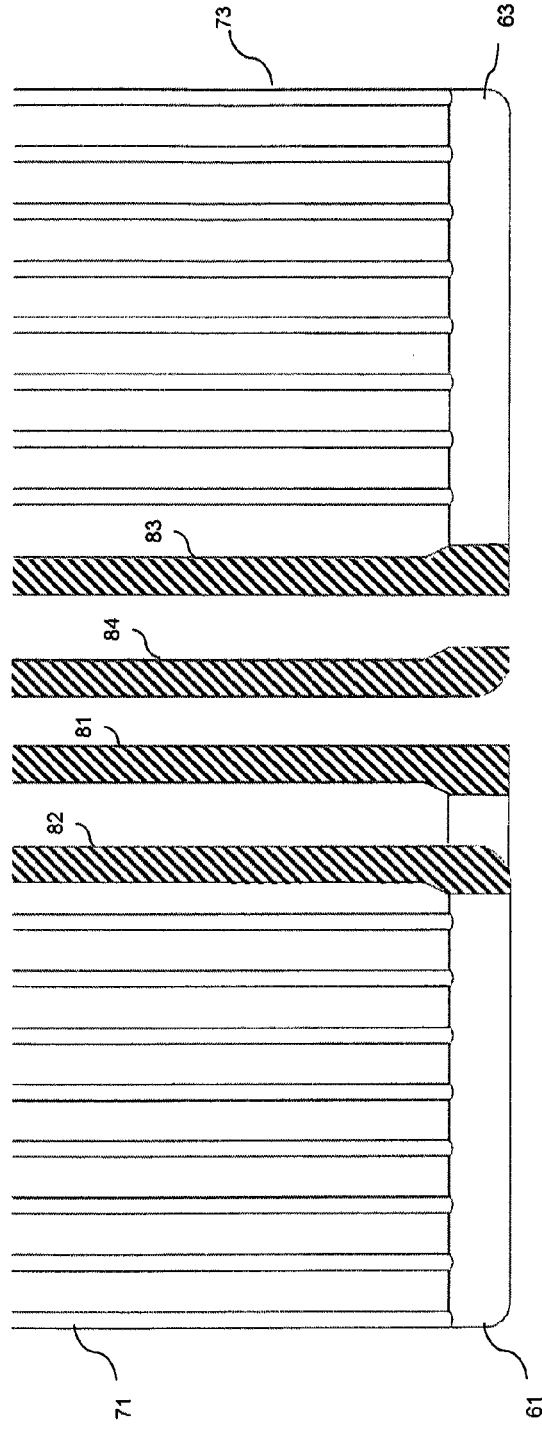
FIG. 4A: TOP VIEW RADIANT TUBES
FIG. 4B: SECTION AA RADIANT TUBES

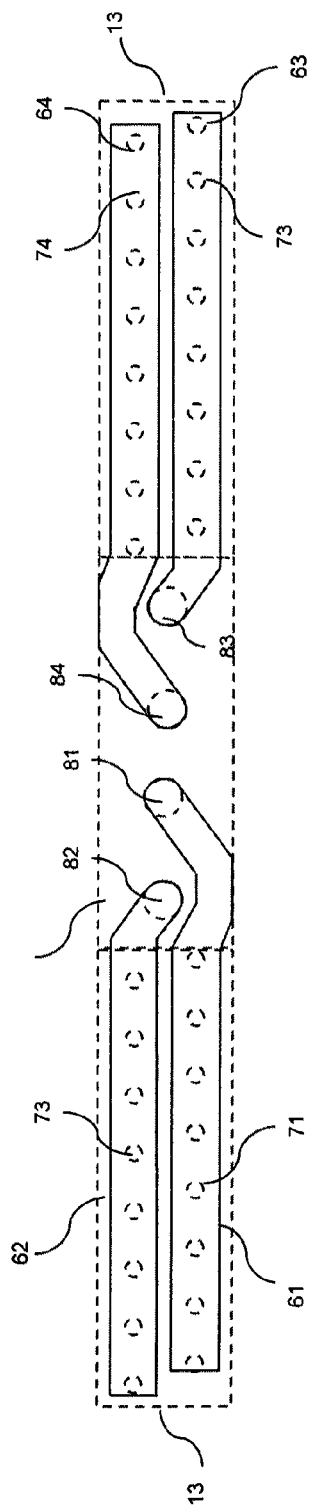
FIG. 4C: BOTTOM VIEW RADIANT TUBES
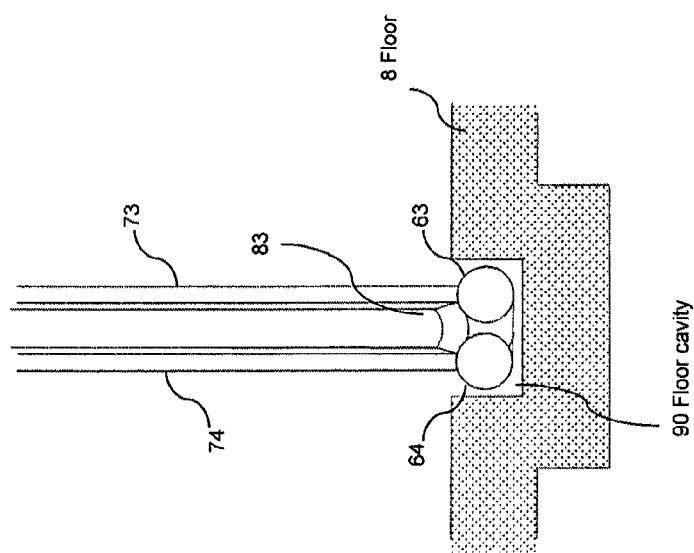
FIG. 4D: END VIEW

Top view of floor burner

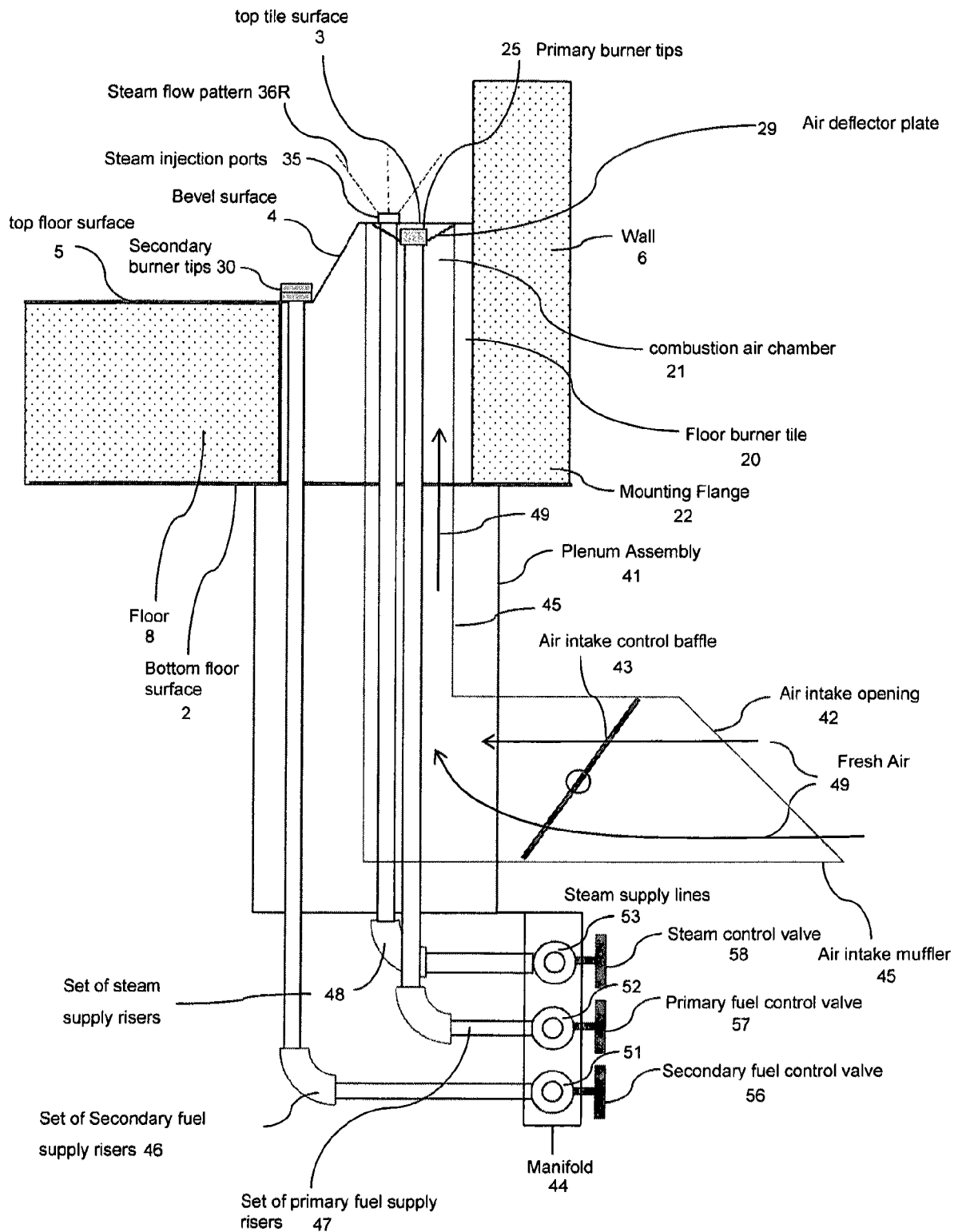
Figure 6 - Section BB

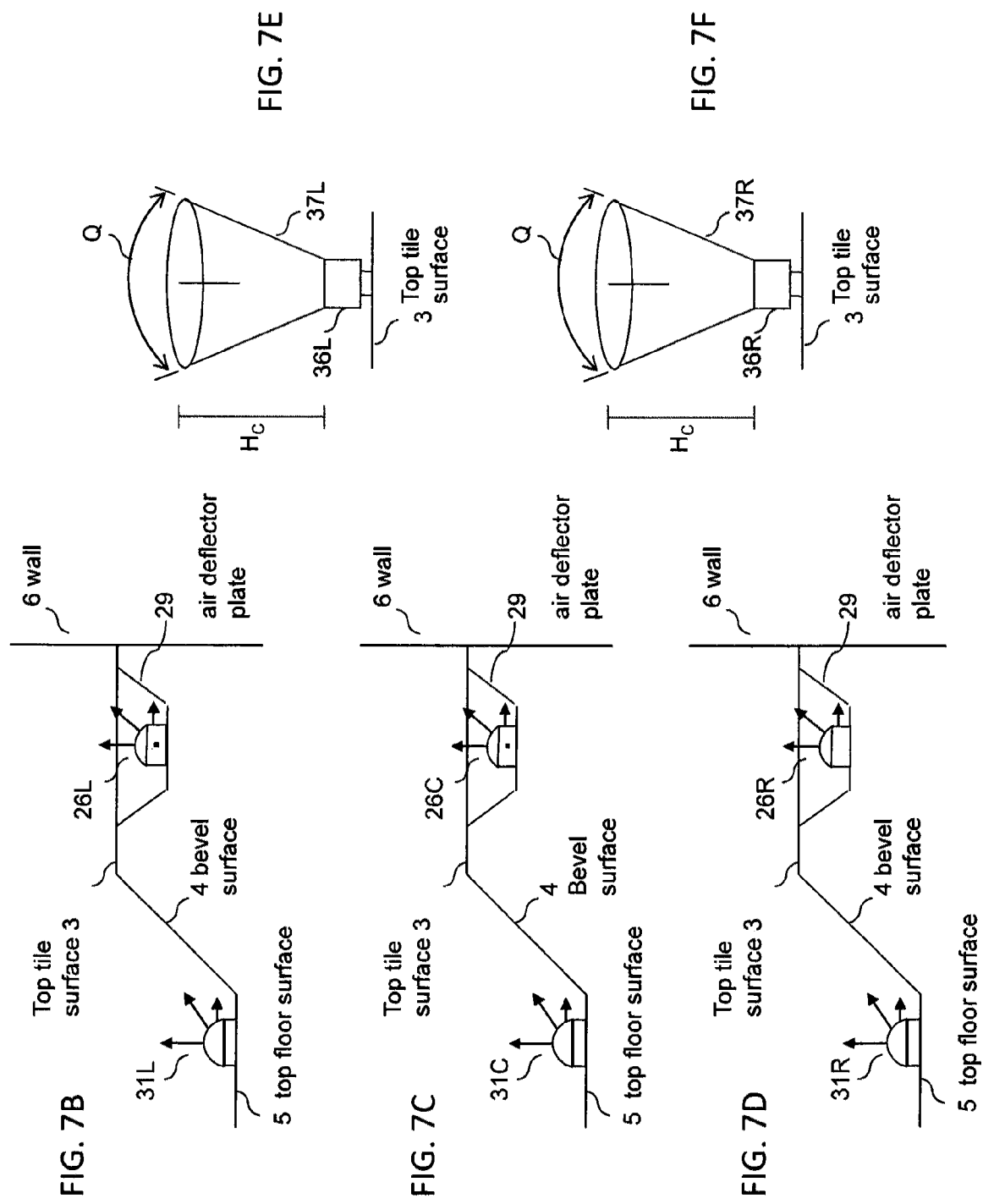

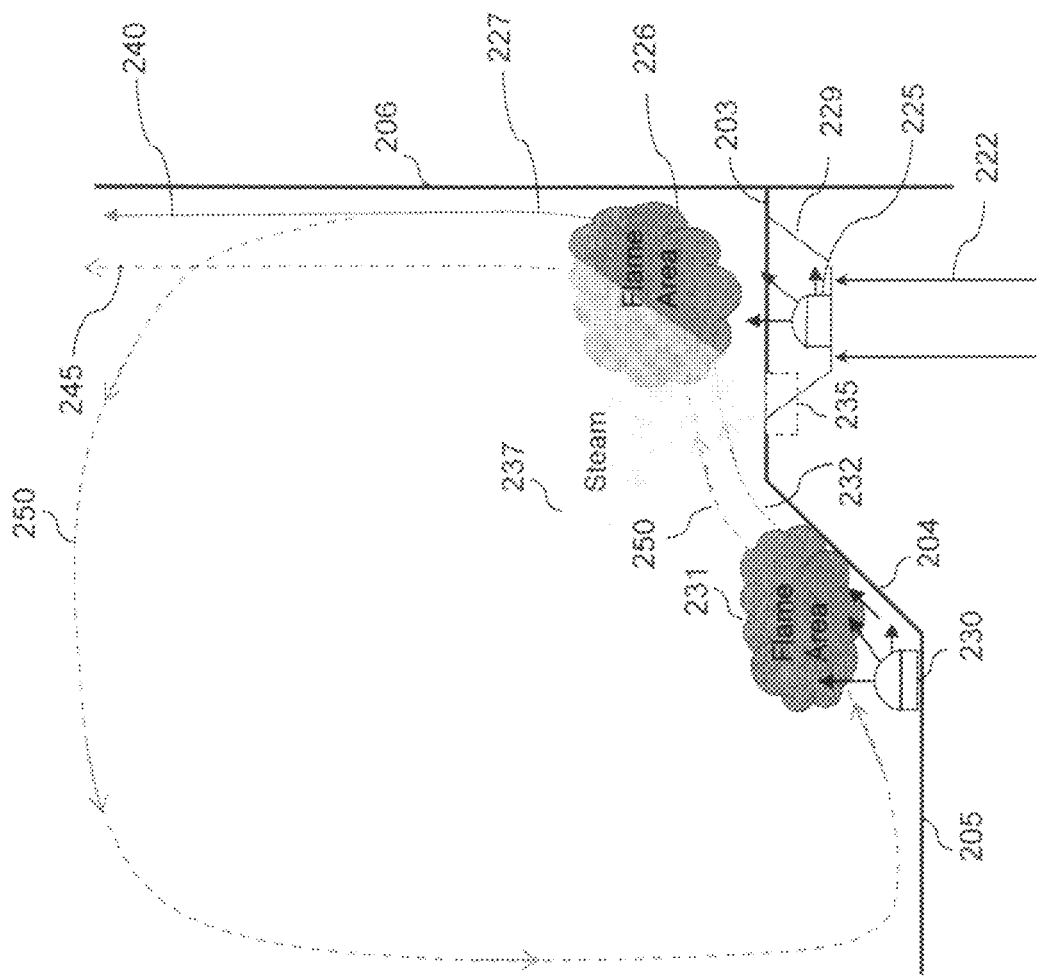

HYDROCARBON CRACKING FURNACE WITH STEAM ADDITION TO LOWER MONO-NITROGEN OXIDE EMISSIONS

FIELD OF THE INVENTION

This application relates to the reduction of pollutants in hydrocarbon cracking furnaces, especially those pollutants containing oxides of nitrogen.

BACKGROUND OF THE INVENTION

During combustion processes, nitrogen in the air and/or fuel is thermally oxidized into nitric oxide (NO) or nitrogen dioxide ($NO_2$). Combined, these products of reaction are referred to as mono-nitrogen oxides (NOx). NOx emissions are a significant pervasive pollutant that causes a wide variety of diseases, contributes to ozone and smog formation, causes 20 to 30 percent of acid rain, and is the basis for visibility problems because of the formation of aerosols.

NOx is generally produced by a thermal NOx process or a fuel NOx process. Thermal NOx is produced from the oxidation of nitrogen ($N_2$) at temperatures above 1500° F. and is thus related to high flame temperatures. Fuel NOx results from oxidation of nitrogen organically bound in the fuel.

Thermal NOx is the primary source of NOx formation when natural gas and distillate oils are used for combustion because these fuels contain generally lower nitrogen content or are devoid of nitrogen altogether. Sources of thermal NOx include automobiles, power plants, industrial furnaces, and boilers. Petroleum refining represents about 5% of the total NOx emissions which are often concentrated in small geographic areas known as non-attainment areas wherein unusually high concentrations of NOx and concomitant ozone may accumulate. It is has been and continues to be a matter of environmental and commercial interest to reduce NOx emissions in furnaces used in the petroleum refining industry such a hydrocarbon cracking furnaces, especially in non-attainment areas.

There are two primary technology paths for reducing NOx. A first technology is to utilize selective catalytic reduction (SCR) to convert the exhaust NO to $N_2$ and $H_2O$ by reacting with ammonia. A second technology is to utilize low NOx burners to reduce the formation of NOx during combustion. SCR implementations, while very effective, can be cost prohibitive. The subject of the present invention relates to a more cost effective low NOx burner.

Low NOx burners may employ a number of methods to reduce NOx. A first method is staging the combustion process where fuel rich and fuel lean zones are established within the flame. The fuel rich zone is the primary combustion zone and prevents the formation of thermal NOx by providing a low oxygen concentration. Fuel lean zones have generally lower flame temperatures than stoichiometric flames which result in lower thermal NOx and lower fuel NOx.

Since NOx formation is highly dependent upon flame temperature, small reductions in flame temperatures can dramatically lower NOx formation. This is generally accomplished by diluting the fuel-air mixture with inert material such as flue-gases or with steam. Flue gases are just the gaseous combustion products of the flame. Burners that utilize the former technique are classified as FGR (flue-gas-recirculation) burners. Injection of steam is accomplished typically by a) injecting steam into the source combustion air prior to mixing with the fuel, or (b) injecting the steam into the fuel itself, prior to mixing with the combustion air.

Ultra low NOx burners aim to lower the NOx emissions below 30 ppm for industrial furnaces with the ultimate goal of reaching better than 5 ppm. Several references disclose devices and methods for lowering NOx emissions in fuel burners. Pre-mixing of steam with gaseous or atomized liquid fuel or combustion air is known.

For instance, U.S. Pat. No. 3,907,488 to Takahashi et al discloses two sets of heavy oil burners including a fuel rich burner and a fuel lean burner arranged in an alternating pattern so as to operate both burners in a regime that produces lower NOx. The burners utilize vaporized water to create and cool gasified combustion oil. Light oil burners utilize a spray of water surrounding the gasified fuel jet.

A second example is U.S. Pat. No. 5,983,622 to Newburry, et al., where steam is premixed with fuel in a diffusion flame combustor by spraying the liquid fuel stream into a flow of steam to produce a combined fuel/steam flow. Newburry teaches away from separately injecting fuel and steam into diffusion flame combustors to decrease the peak flame temperature to lower the production of NOx. Newburry claims that uneven distributions of oil and steam into a combustor result in locally hot and cold regions, thereby causing a higher production of CO.

U.S. Pat. No. 6,986,658 to Stephens, et al. discloses pre-mixing of the fuel and steam in a burner for steam cracking. The apparatus provides a method for mixing combustion air, flue gas and steam to reduce NOx emissions by reducing the temperature of the mixture.

Other prior art discloses the introduction of steam from a port separate from the fuel port and intermixing the steam and fuel in the combustion chamber. One example is U.S. Pat. No. 7,104,069 to Martling, et al. This reference discloses a method for providing a regulated steam flow to fuel nozzle assemblies for a gas turbine combustor. Steam is injected separately from the fuel in an annular array adjacent the fuel nozzle.

Another example is U.S. Pat. No. 5,285,628 to Korenburg. Korenburg discloses fuel combusted first in a first fuel lean region and then again in a fuel rich region. Steam and air is injected into each combustion region to reduce NOx formation. The staged combustion apparatus is designed to operate a gas turbine.

U.S. Pat. No. 4,533,314 to Herberling shows steam used as a cooling gas, introduced into a combustion chamber so that steam mixes with the combustion gas in approximately equal amounts with the flue gas in an interleaving arrangement whereby the concentration of steam is maximized at the flame front.

U.S. Pat. No. 5,344,307 to Schwartz et al discloses methods and apparatus for burning fuel with low NOx formation including a primary reaction zone, a secondary reaction zone and a steam injection nozzle disposed within the burner housing below the primary and secondary reaction zones.

The injection of steam is seemingly an inexpensive way to reduce NOx formation in many types of burners, including gas turbines. However, steam injection has some drawbacks. For gas burners it is known that the premixing of steam into gaseous fuel lines causes corrosion in the carbon steel lines and excess degradation due to fuel gas condensation so that the fuel gas lines must be cleaned periodically or replaced with stainless steel to prevent corrosion. This can be costly and time consuming.

Furthermore when pre-mixing of steam into gaseous fuel lines, less fuel will flow through the small fuel tips, which require larger openings to use the same volume of fuel and therefore achieve similar heating rates. Prior art burners fail to optimize burner nozzles to lower NOx levels by steam-fuel mixtures. Therefore, the nozzle openings must be modified to allow proper target fuel and steam flow. During modification, the burner performance may be compromised as nozzle opening size, location and direction are parameters engineered for a particular performance by the manufacturer.

The injection of steam into combustion air requires that steam be distributed evenly throughout the combustion region, which poses problems for the large burner assemblies of industrial furnaces. Furthermore, in comparison to the premixed fuel/steam method, a much larger volume of steam is required to achieve comparable NOx emission results.

In practice, there is a need for ultra low NOx burners for industrial furnaces, in particular hydrocarbon cracking furnaces that incorporate steam addition at a location other than in the air/fuel premix region or in the fuel itself.

SUMMARY OF THE INVENTION

A first method for reducing mono-nitrogen oxide emissions from a hydrocarbon cracking furnace is disclosed wherein the cracking furnace comprises a firebox with a floor, two side walls, two end walls and a roof with an exhaust stack for exhausting flue gases. A set of wall burners are disposed along the two side walls. A set of floor burners are disposed on the floor adjacent to the two side walls, a set of hybrid radiant tubes are positioned near a vertical central plane bisecting each of the two end walls. Sources of fuel gas, steam, ambient combustion air are provided.

A set of primary burner tips are connected with tubes and pipelines to the source of fuel gas and to the set of floor burners. A set of secondary burner tips are connected with tubes and pipelines to the source of fuel gas and to the set of floor burners at a height below the set of primary burner tips and between the set of primary burner tips and the vertical central plane. A set of steam injection ports are further connected with tubes and pipelines to the source of steam and to the set of floor burners between the set of secondary burner tips and the set of primary burner tips at a similar height to the primary burner tips. The steam jets generally upward and spreads out into a cone-like flow shape when it exits the steam injection ports. The steam disperses to a height of between 12 inches and 18 inches above the steam injection ports.

A first fuel gas flow is provided from the source of fuel gas to the set of primary burner tips at a flow rate $F1$. A second fuel gas flow is provided from the source of fuel gas to the set of secondary burner tips at a flow rate $F2$. A third fuel gas flow is provided from the source of fuel gas to the wall burners at a flow rate $F3$. A steam flow is provided from the source of steam to the set of steam injection ports at a flow rate $S$, creating a set of conical steam flows, where the flow rate $S$ is between about 25% and about 100% of a combined flow rate $F=F1$ (primary)$+F2$ (secondary)$+F3$ (wall).

Combustion air flow is adjusted to flow from the source of combustion air to the set of primary burner tips where it is mixed with the first fuel gas flow as a first mixture containing a sub-stoichiometric amount of fuel gas. The first mixture is burned to create a first set of flames and a first flue gas. A portion of the first flue gas is recirculated and the remaining portion of the first flue gas is exhausted through a convection section and exhaust stack. The recirculated portion of the flue gas is mixed with the second fuel gas flow as a second mixture containing a sub-stoichiometric amount of oxygen and burned to create a second set of flames and a second flue gas. The second flue gas and unburned fuel from the second fuel gas flow is burned with the first mixture at the primary burner tips to contribute to the first flue gas. Oxygen is thereby depleted from the recirculated portion of the flue gas, after which the recirculated portion of the flue gas is exhausted from the furnace.

The third fuel gas flow is burned by the set of wall burners to create a third set of flames and a third flue gas. A portion of all the flue gases are recirculated and the remaining portion is exhausted through the exhaust stack.

The conical flows of steam contact the first set of flames which results in lower flame temperature and reduce thermal NOx.

The first, second and third sets of flames deliver a total heat flux through a horizontal cross-section of the firebox of between about 250,000 and about 400,000 BTU/sq. ft.

In another aspect of the first method, a source of feedstock is provided for hydrocarbon cracking, where the source of feedstock is connected with tubes and pipelines to the hybrid radiant tubes. The feedstock is allowed to flow into the hybrid radiant tubes where the feedstock molecules comprising the feedstock are heated within the hybrid radiant tubes by the total heat flux thereby cracking the feedstock molecules into a desired hydrocarbon product in a cracking process. The desired hydrocarbon product flows into the transfer line heat exchangers where the cracking process is quickly quenched and the desired hydrocarbon product flows away from the firebox.

The flue gas then enters a convection section to transfer heat and to superheat a saturated steam used for pre-heating other components.

In another aspect of the first method, the desired hydrocarbon products are olefins, including but not limited to ethylene, propylene and butadiene. In yet another aspect of the first method, the desired hydrocarbon products are selected from the aromatics, including but not limited to benzene.

A second method for reducing mono-nitrogen oxide emissions from a hydrocarbon cracking furnace is disclosed wherein the cracking furnace comprises a firebox with a floor, two side walls, two end walls and a roof with an exhaust stack for exhausting flue gases. A set of M wall burners are disposed along the two side walls. A set of N floor burners are disposed on the floor adjacent to the two side walls, a set of hybrid radiant tubes are positioned near a vertical central plane bisecting each of the two end walls. Sources of fuel gas, steam, and ambient air are provided.

A set of 3N primary burner tips are connected with tubes and pipelines to the source of fuel gas and to the set of N floor burners. A set of 3N secondary burner tips are connected with tubes and pipelines to the source of fuel gas and to the set of N floor burners at a height of between about 4 inches and about 6 inches below the set of 3N primary burner tips and between the set of 3N primary burner tips and the vertical central plane. A set of 2N steam injection ports are connected with tubes and pipelines to the source of steam and to the set of N floor burners between the set of 3N secondary burner tips and the 3N primary burner tips at a height about equal to that of the set of primary burner tips. Each floor burner has a sloped surface between the secondary burners and the primary burners, where a recirculated flue gas mixes and dilutes fuel near the secondary burner as it moves up the sloped surface toward the primary burner. The steam is added to this diluted fuel as it comes off the sloped surface on the way to the rich fuel primary burner. A flow of fresh air enters around the primary burner.

A flow of fuel gas is delivered into the firebox with a flow rate F of between 0.25 and 0.35 lb/hr per cubic foot of volume of the firebox. A flow of steam is delivered into the set of 2N steam injection ports with a flow rate S of between about one-fourth and about one-half of the flow rate F. The flow of fuel gas is divided into a first flow to the set of M wall burner burners with flow rate F1 and into a second flow to the set of N floor burners with flow rate F2, where F1/F2 is between about 0.0 and about 0.25, F1 being zero where there are no wall burners and M=0. The second flow is subdivided into a third flow and a fourth flow, the third flow going to the set of 3N primary burner tips with flow rate F3 and the fourth flow going to the set of 3N secondary burner tips with flow rate F4, where F3/F4 is between about 0.1 and 0.2. The flow of fresh air is delivered to the N floor burners by adjusting an air intake baffle connected to a source of ambient air where it is mixed with the third flow.

The third flow is further subdivided into left, right and center primary burner flows with flow rates, PL, PR and PC, respectively, where PL is about the same as PR and PC/PL is between 1.1 and 1.3. The fourth flow is further subdivided into left, right and center secondary burner flows with about equal flow rates.

Fuel gas from the first flow is burned to create a first set of flames and a first flue gas. Fuel gas from the left, right and center primary burner flows is burned to create a second set of flames and a second flue gas. Fuel gas from the left, right and center secondary burner flows is burned to create a third set of flames and a third flue gas.

As a result of the fuel gases being burned, a total heat flux is delivered through a horizontal cross-section of the firebox of between about 250,000 and about 400,000 BTU/sq. ft.

A portion of the first, second and third flue gases are exhausted through the exhaust stack and the remaining portion of the first, second and third flue gases are recirculated. The 2N steam injection ports spray steam into 2N conical steam flows which make contact with the second set of flames thereby reducing flame temperature and NOx emissions.

In another aspect of the second method, a source of feedstock is provided for hydrocarbon cracking, where the source of feedstock is connected to the hybrid radiant tubes. A transfer line heat exchanger is connected with tubes and pipelines to the hybrid radiant tubes. The feedstock is allowed to flow into the hybrid radiant tubes where the feedstock molecules comprising the feedstock are heated within the hybrid radiant tubes by the total heat flux thereby cracking the feedstock molecules into a desired hydrocarbon product in a cracking process. The desired hydrocarbon product flows into the transfer line heat exchanger where the cracking process is quenched and the desired hydrocarbon product flows away from the firebox.

In another aspect of the first method, the desired hydrocarbon products are olefins, including but not limited to ethylene, propylene and butadiene. In yet another aspect of the invention, the desired hydrocarbon products are aromatics, including but not limited to benzene.

In another embodiment, a hydrocarbon cracking furnace is upgraded to reduce mono-nitrogen oxide emissions where the upgraded hydrocarbon cracking furnace comprises a firebox with a floor, two side walls, two end walls and a roof with an exhaust stack for exhausting flue gases. A set of wall burners are attached to the two side walls; a set of floor burners are attached to the floor adjacent to the two side walls; a set of hybrid radiant tubes are positioned near a vertical central plane bisecting each of the two end walls, a feedstock source being attached at one end of the hybrid radiant tubes and a transfer line heat exchanger on the other end of the hybrid radiant tubes. Adjustable sources of fuel gas, steam and combustion air are provided. If the existing floor burners are incompatible with upgrade burner tips, they are removed from the firebox.

A set of primary burner tips are provided on the set of floor burners between about 4 inches and about 9 inches above the floor and connected with tubes and pipelines to the source of fuel gas. A set of secondary burner tips are provided on the set of floor burners extending between about 1 inch and 2 inches above the floor, fixed between the set of primary burner tips and the vertical central plane and connected with tubes and pipelines to the source of fuel gas.

A first fuel gas flow is provided from the source of fuel gas to the set of primary burner tips at a flow rate F1. A second fuel gas flow is provided from the source of fuel gas to the set of secondary burner tips at a flow rate F2. A third fuel gas flow is provided from the source of fuel gas to the wall burners at a flow rate F3. A steam flow is provided from the source of steam to the set of steam injection ports at a flow rate S, creating a set of conical steam flows, where the flow rate S is between about 25% and about 100% of a combined flow rate F=F1 (primary)+F2 (secondary)+F3 (wall).

Fresh air flow is adjusted to flow from the source of fresh air to the set of primary burner tips where it is mixed with the first fuel gas flow as a first mixture containing a sub-stoichiometric amount of fuel gas. The first mixture is burned to create a first set of flames and a first flue gas. A portion of the first flue gas is recirculated and the remaining portion of the first flue gas is exhausted through the exhaust stack. The recirculated portion of the flue gas is mixed with the second fuel gas flow as a second mixture containing a sub-stoichiometric amount of oxygen and burned to create a second set of flames and a second flue gas. The second flue gas and unburned fuel from the second fuel gas flow is burned with the first mixture at the primary burner tips to contribute to the first flue gas.

The third fuel gas flow is burned by the set of wall burners to create a third set of flames and a third flue gas. The third flue gas and the recirculated portion of the flue gas is also exhausted through the exhaust stack.

The conical flows of steam contact the first set of flames which results in lower flame temperature and reduce thermal NOx.

The first, second and third sets of flames deliver a total heat flux through a horizontal cross-section of the firebox of between about 250,000 and about 400,000 BTU/sq. ft.

A preferred embodiment hydrocarbon cracking furnace is disclosed for producing low mono-nitrogen oxide emissions. The hydrocarbon cracking furnace comprises a firebox with a floor, two side walls, two end walls and a roof, an exhaust stack connected to the roof for exhausting flue gases from the firebox, a set of wall burners attached to the two side walls, a set of floor burners attached to the floor adjacent to the two side walls, a set of hybrid radiant tubes positioned near a vertical central plane bisecting each of the two end walls and further attached to a feedstock source at one end and a transfer line heat exchanger on the other end.

The set of floor burners include a set of burner tiles having a top tile surface adjacent to the side wall, a lower surface positioned between the top tile surface and the vertical central plane, and a beveled surface connecting the lower surface to the top tile surface where the top tile surface is between about 4 inches and about 9 inches above the floor and the lower surface is at the level of the floor.

The set of burner tiles further include a chamber. A set of primary burner tips are attached to the set of burner tiles inside the chamber at a height of between about 3 inches below the top tile surface to about the level of the top surface, and connected with tubes and pipelines to the source of fuel gas. An air intake baffle connects ambient air to the chamber. A set of secondary burner tips are attached to the set of burner tiles at the lower surface and extending to a height of between about 3 inches above the lower surface to about the level of the lower surface, the set of secondary burner tips connected with tubes and pipelines to the source of fuel gas.

A set of steam injection ports are further connected with tubes and pipelines to the source of steam and to the set of floor burners between the set of secondary burner tips and the primary burner tips at a similar height to the primary burner tips. The steam jets generally upward and spreads out into a cone like flow shape when it exits the steam injection ports. The steam disperses to a height of between 12 inches and 18 inches above the steam injection ports.

A first fuel gas flow connects the source of fuel gas to the set of primary burner tips at a flow rate R1. An ambient air flow connects ambient air to the set of primary burner tips sufficient to enable a fuel-rich combustion at the primary burner tips. A second fuel gas flow connects the source of fuel gas to the set of secondary burner tips at a flow rate R2. A third fuel gas flow connects the source of fuel gas to the wall burners at a flow rate R3. A steam flow at a flow rate S connects the set of steam injection ports to the source of steam, the steam flow emerging from the set of steam injection ports into the firebox as a set of conical steam flows, where the flow rate S' is between about 25% and about 100% of a combined flow rate R=R1 (primary)+R2 (secondary)+R3 (wall). If there are no wall burners, R3=0 and the combined flow rate R=R1+R2.

A recirculating flue gas flows from the combustion of the first fuel gas flow and recirculates back to the set of secondary burners.

A set of pilot burners are attached to the set of floor burners in proximity to the primary burner tips, the set of pilot burners connected via a set of pilot valves to the source of fuel gas.

A feedstock flow is established from the feedstock source into the hybrid radiant tubes and a hydrocarbon product flow is established out of the hybrid radiant tubes and into the transfer line heat exchangers. The feedstock flow of hydrocarbon product can be olefins, including but not limited to ethylene, propylene and butadiene. The feedstock flow is at a rate of between about 45,000 and 65,000 lb/hr.

In one aspect, a set of primary flames are generated at each of the set of primary burner tips wherein the set of primary flames are generated by the fuel-lean combustion and a set of secondary flames are generated by a fuel-rich combustion at the secondary burner tips. A set of wall burner flames are generated at the set of wall burners. Each conical steam flow of the set of conical steam flows is in contact with at least two primary flames in the set of primary flames.

In another aspect, each conical steam flow of the set of conical steam flows has a cone aperture angle of between about 50 degrees and 70 degrees and with a cone height of between 12 inches and 18 inches.

When no wall burners are utilized, the flow rate R1 is between about 0.1 R and about 0.2 R. The flow rate R2 is between about 0.8 R and about 0.9 R. The flow rate S' is between about 0.25 R and 1.0 R.

When wall burners are utilized, the flow rate R1 is between about 0.08 R and about 0.15 R. The flow rate R2 is between about 0.67 R and about 0.80 R. The flow rate R3 is between about 0.1 R and 0.2 R. The flow rate S' is between about 0.25 R and 1.0 R.

The combined flow rate R is between about 8,500 lb/hr and about 11,000 lb/hr. The flow rate S is between about 0.25 the combined flow rate R and equal to the combined flow rate R. In a related aspect, the floor burners and wall burners combine to produce between about 200 MMBTU/hr and about 250 MMBTU/hr.

In another aspect, the recirculating flue gas flow contains oxygen at a level of about 2% $O_2$ by volume.

In the preferred embodiment, the set of wall burners include between 40 and 50 wall burners and the set of floor burners include between 15 and 20 floor burners. Each floor burner in the set of floor burners includes three primary burner tips, three secondary burner tips and two steam injection ports.

In alternate embodiments, fewer or more wall burners and floor burners are utilized as needed. The number of steam injection ports per primary burner tip can vary on average from much less than one to much greater than one, but typically not less than 1:4 and not more than 2:1.

Preferably, there are multiple rows of wall burners. Three rows of wall burners on a first of the firebox and two rows of wall burners on the opposing side of the firebox are disclosed. The set of wall burners are preferably distributed so that there are five wall burners for every two floor burners.

These and other inventive aspects are disclosed in the drawings and the detailed description below.

BRIEF DESCRIPTION OF THE DRAWINGS

Aspects of the present disclosure are best understood from the following detailed description when read with the accompanying figures.

FIG. 4A is a top view showing a set of inlet radiant tubes, a set of outlet radiant tubes and the manifolds connecting the set of inlet radiant tubes to the set of outlet radiant tubes.

FIG. 4B is a cross-sectional view showing the set of inlet radiant tubes, the set of outlet radiant tubes and the manifolds connecting the set of inlet radiant tubes to the set of outlet radiant tubes.

FIG. 4C is a bottom view showing the set of inlet radiant tubes, the set of outlet radiant tubes and the manifolds connecting the set of inlet radiant tubes to the set of outlet radiant tubes.

FIG. 4D is an end view showing the set of inlet radiant tubes, the set of outlet radiant tubes and the manifolds connecting the set of inlet radiant tubes to the set of outlet radiant tubes.

FIG. 6 is a cross-sectional view of a preferred embodiment floor burner showing the burner tips, steam injection ports and other components and surfaces.

FIGS. 7A-7F show preferred embodiment fuel flow patterns and steam flow patterns of primary and secondary burner tips.

FIG. 9 is a diagrammatic view of the flow of flue gas between the primary burner tips and the secondary burner tips and the exhaust.

DETAILED DESCRIPTION

It is to be understood that the following disclosure describes only preferred embodiments. The specific example of components and arrangements of components in the preferred embodiments are not intended to be limiting. The apparatus and method of steam addition in relation to fuel burners can be applied to numerous geometries of hydrocarbon cracking furnaces to reduce NOx emissions.

Figure 1:
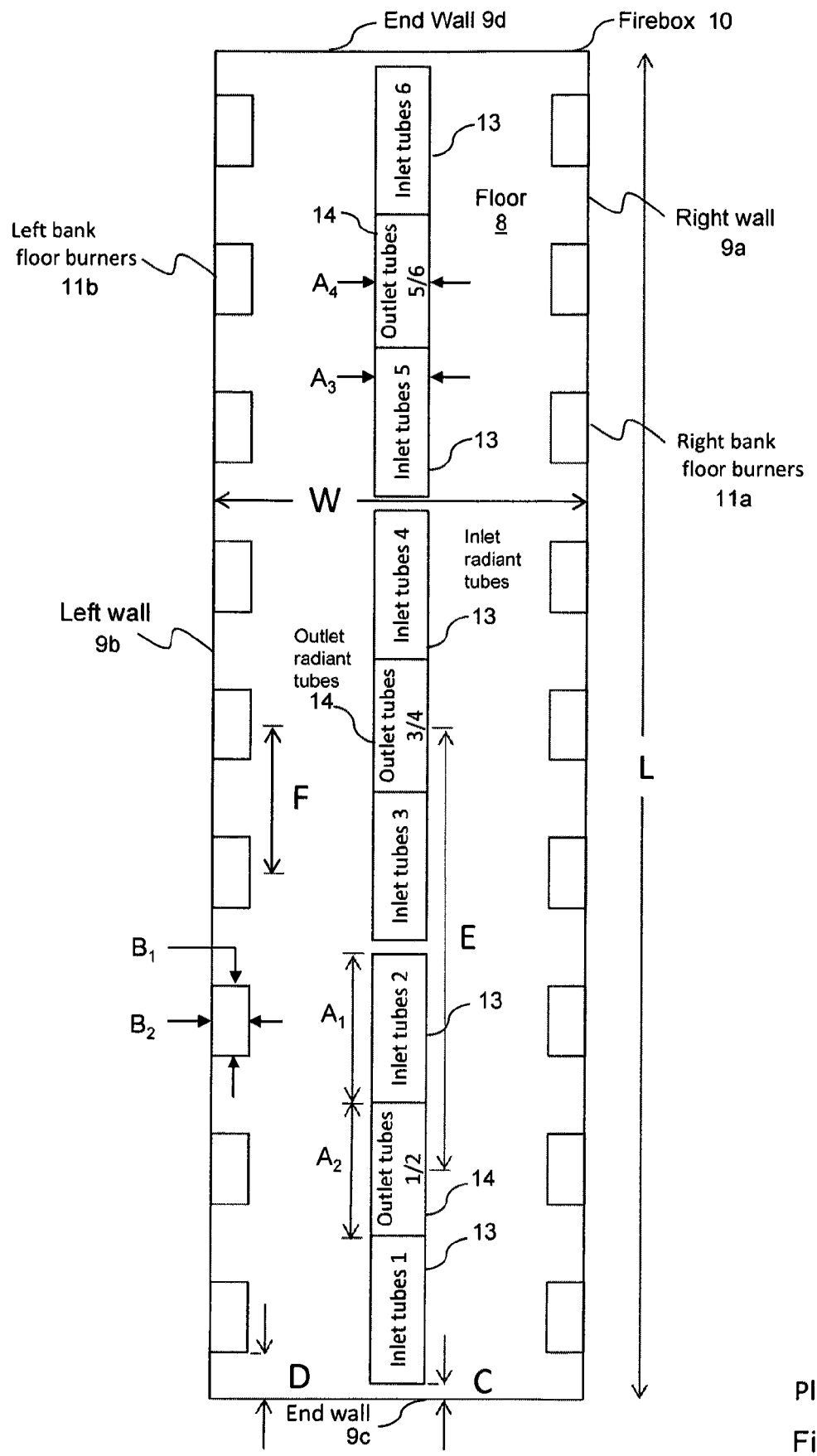
FIG. 1 is a plan view drawing of a preferred embodiment hydrocarbon cracking furnace showing the positioning of floor burners with respect to inlet and outlet radiant tubes.
Figure 2:
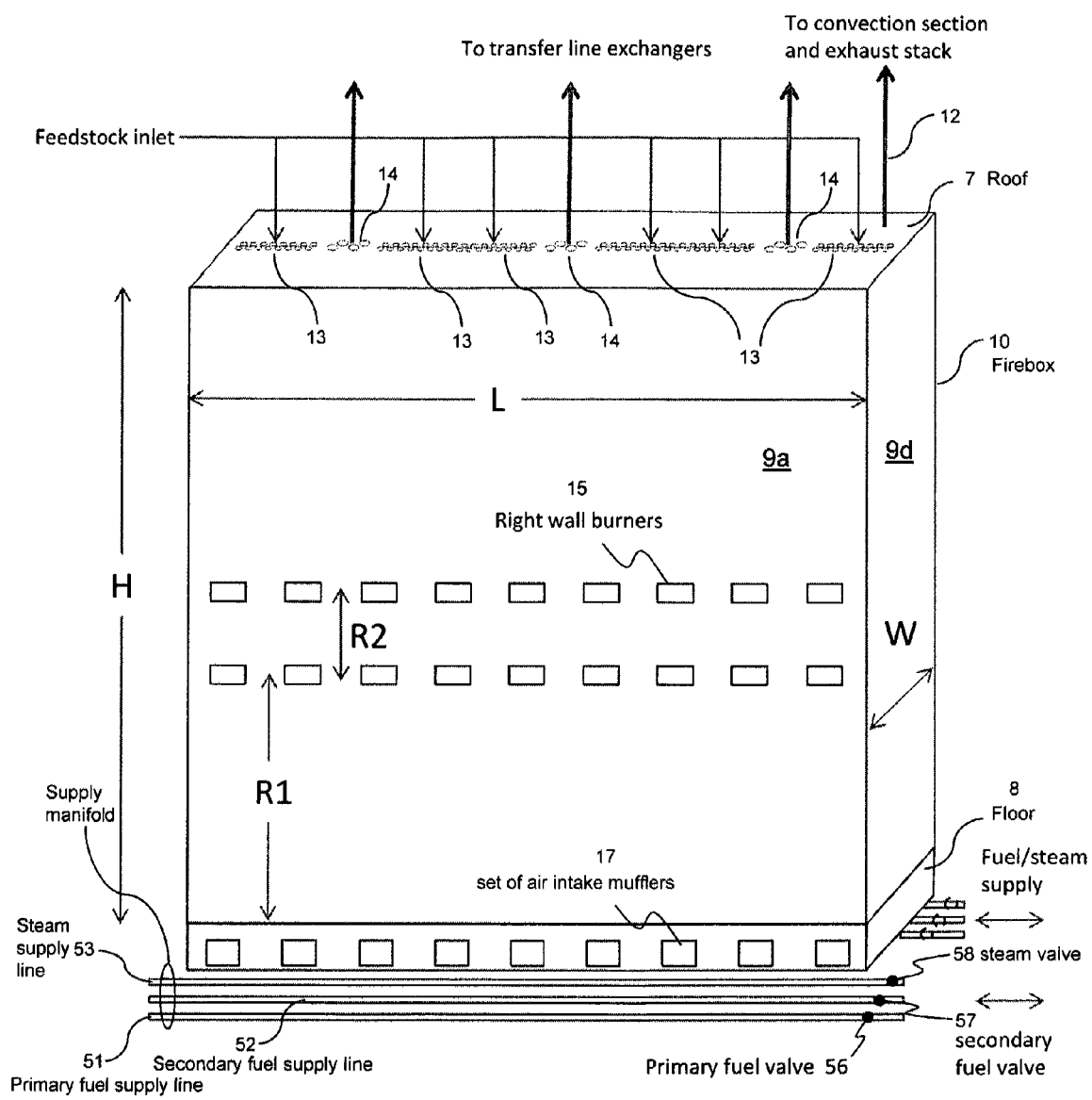
FIG. 2 is a right side elevation drawing of a preferred embodiment hydrocarbon cracking furnace, showing the wall burners, fuel gas plumbing, intake and exhaust of hydrocarbon products, intake and exhaust of combustion products.
Figure 3:
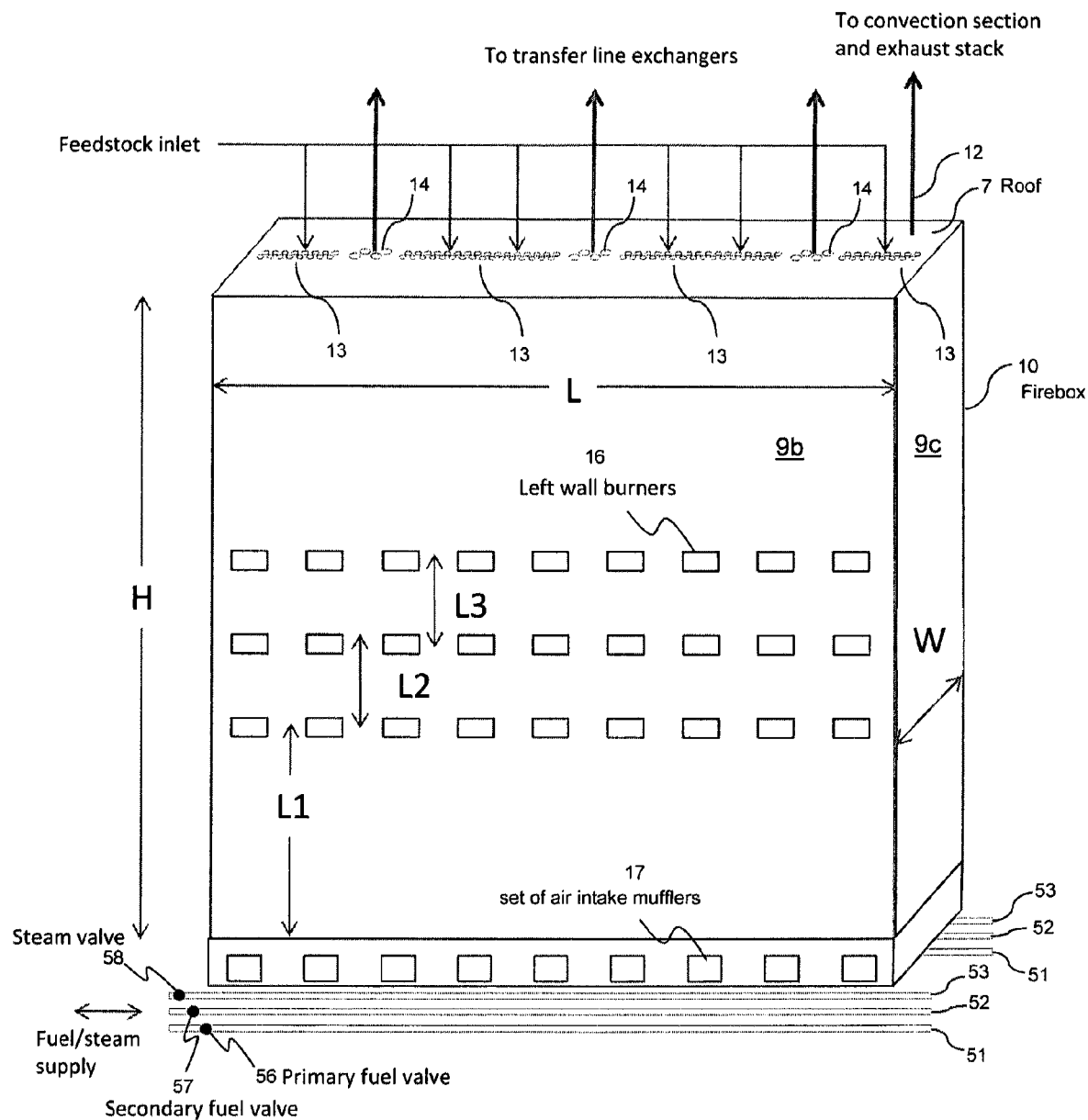
FIG. 3 is a left side elevation drawing of a preferred embodiment hydrocarbon cracking furnace, showing the wall burners, fuel gas plumbing, intake and exhaust of hydrocarbon products, intake and exhaust of combustion products.

Referring to FIGS. 1, 2 and 3 the cracking furnace comprises firebox 10 having floor 8, attached to right wall 9a, left wall 9b and two end walls 9c and 9d. A roof encloses firebox 10 on the top side. Firebox 10 has length dimension L, width dimension W and height dimension H. FIGS. 1, 2 and 3 are approximately in proportion to a preferred embodiment, the firebox having a floor area preferably in the range of about 600 sq. ft. to about 800 sq. ft and a volume in the range of about 30,000 cu. ft. to about 40,000 cu. ft.

In FIG. 1, the cracking furnace includes inlet radiant tube sections 13 and outlet radiant tube sections 14. A preferred embodiment has six inlet radiant tube sections and three outlet radiant tube sections, the inlet radiant tube section having length dimension $A_1$ and width dimension $A_3$, the outlet radiant tube section having length dimension $A_2$ and width dimension $A_4$. The inlet and outlet radiant tube sections are formed into three tube groups disposed in a vertical plane near the center of the firebox about halfway between the right and left walls. Each tube group comprises an outlet radiant tube section shared by two adjacently placed inlet radiant tube sections. Each tube group is separated, center-to-center by distance dimension E. The two outermost inlet radiant tube sections are disposed a distance C from the end walls. Inlet and outlet radiant tubes contained within the radiant tube sections run vertically from the ceiling to the floor.

Attached to floor 8 is right bank of floor burners 11a set against right wall 9a and left bank of floor burners 11b set against right wall 9b. Each floor burner in the bank of left and right floor burners has length dimension $B_1$ and width dimension $B_2$ and are disposed a distance dimension F apart from one another. The two outermost floor burners are disposed a distance D from the end walls.

Referring now to FIGS. 2 and 3, underneath firebox 10 is set of air intake mufflers 17, primary fuel supply lines 51, secondary fuel supply lines 52 and steam supply lines 53. Roof 7 encloses firebox from above. Primary fuel valves 56, attached to primary fuel supply lines 51, and secondary fuel valves 57, attached to secondary fuel supply lines 52, control fuel gas flow to primary and secondary burner tips in the right and left banks of floor burners. Steam valves 58 attached to steam supply line 53 control steam flow to the right and left banks of burners.

Attached to right wall 9a of firebox 10 is set of right wall burners 15 including a first row of wall burners disposed a distance $R_1$ above floor 8, and a second row of wall burners disposed a distance $R_2$ from floor 8.

Attached to left wall 9b of firebox 10 is set of left wall burners 16 including a third row of wall burners disposed a distance $L_1$ above floor 8, a fourth row of wall burners disposed a distance $L_2$ above floor 8 and a fifth row of wall burners disposed a distance $L_3$ from floor 8.

The wall burner configuration of FIGS. 2 and 3 are exemplary. In alternate embodiments, additional rows of wall burners are utilized, while in other alternate embodiments, no wall burners are utilized on any wall surface of the firebox.

An example of a suitable wall burner is the LUM-4F radiant wall burner from John Zink Company, Tulsa, Okla.

A set of wall burner supply lines and supply valves (not shown) supply fuel gas to the wall burners. In a preferred embodiment, a common fuel gas source is attached to the wall burner supply valves, the primary fuel valves and the secondary fuel valves. The preferred fuel gas is mixture of 50% to 100% methane by volume, preferably in the range 25% to 70% methane by volume, with the other major components being hydrogen (30% to 75%) ethane (1%), ethylene (less than 1%) and propane (less than 1%), listed in descending order by volume percentage indicated in parenthesis. The lower heat value (LHV) for the preferred fuel gas is from about 20,000 BTU/lb to about 30,000 BTU/lb, and preferably about 23,000 BTU/lb.

A set of pilot burners (not shown), attached to the common fuel gas source by a set of pilot valves (also not shown), are suitably placed in proximity to burner tips within the floor burners to allow for ignition. Operationally, the set of pilot valves are opened and the pilot burners lit so that ignition of fuel gases occurs at the floor burners when the corresponding fuel valves to the floor burners are opened. The wall burners ignite at a later time, after the furnace has been reached a high temperature and when the corresponding fuel valves are opened to the wall burners.

The firebox walls, ceiling and floor are built from masonry products such as masonry block, brick and cement. Flame temperatures can be as high as about 3000° F. The burner heating capacity and firebox dimensions are selected to maintain temperatures of between 1800° F. (1000° C.) and 2200° F. (1200° C.) during the cracking process. An exhaust stack 12 in combination with a convection section is provided to remove flue gases from the firebox. NOx emissions are measured from sampling points in and around the exhaust stack as prescribed in the EPA Standard under U.S.C. 40 CFR 60 App. A-4, Method 7E.

Above roof 7, inlet radiant tube sections 13 are connected to a pressurized source of feedstock comprising gaseous hydrocarbons such as ethane, butane, propane, naphtha and gas oil pre-mixed with steam. The feedstock flow is preferably at a rate of between about 45,000 and 65,000 lb/hr and pre-mix steam flow commensurate with the desired hydrocarbon products, but typically at a flow rate of about one-third of the feedstock flow.

Outlet radiant tube sections 14 are connected to a set of transfer line heat exchangers which are capable of quickly removing heat from gaseous byproducts of reactions that occur in the inlet and outlet radiant tube sections.

The radiant tube sections are further explained with the help of FIGS. 4A, 4B, 4C and 4D describing a top view, a sectional view, a bottom view, and an end view of a hybrid radiant coil in a preferred embodiment. The hybrid radiant coil comprises one of outlet radiant tube sections 14 connected to two of inlet radiant tube sections 13 via a set of manifolds. Manifold 61 is attached to set of inlet radiant tubes 71 and to outlet radiant tube 81. Manifold 62 is attached to set of inlet radiant tubes 72 and to outlet radiant tube 82. Manifold 63 is attached to set of inlet radiant tubes 73 and to outlet radiant tube 83. Manifold 64 is attached to set of inlet radiant tubes 74 and to outlet radiant tube 84. The manifolds are disposed within a floor cavity 90 in floor 8 so that the feedstock may flow downward into the manifolds via the inlet radiant tubes and then upward into the transfer line heat exchanger via the outlet radiant tubes. The inlet radiant tubes are preferably made of specialty alloy steel tubes having nominal diameters from about ½ inch to about 3 inches. The outlet radiant tubes are preferably made of specialty alloy steel tubes having nominal diameters from about 4 inches and to about 8 inches.

Figure 5:
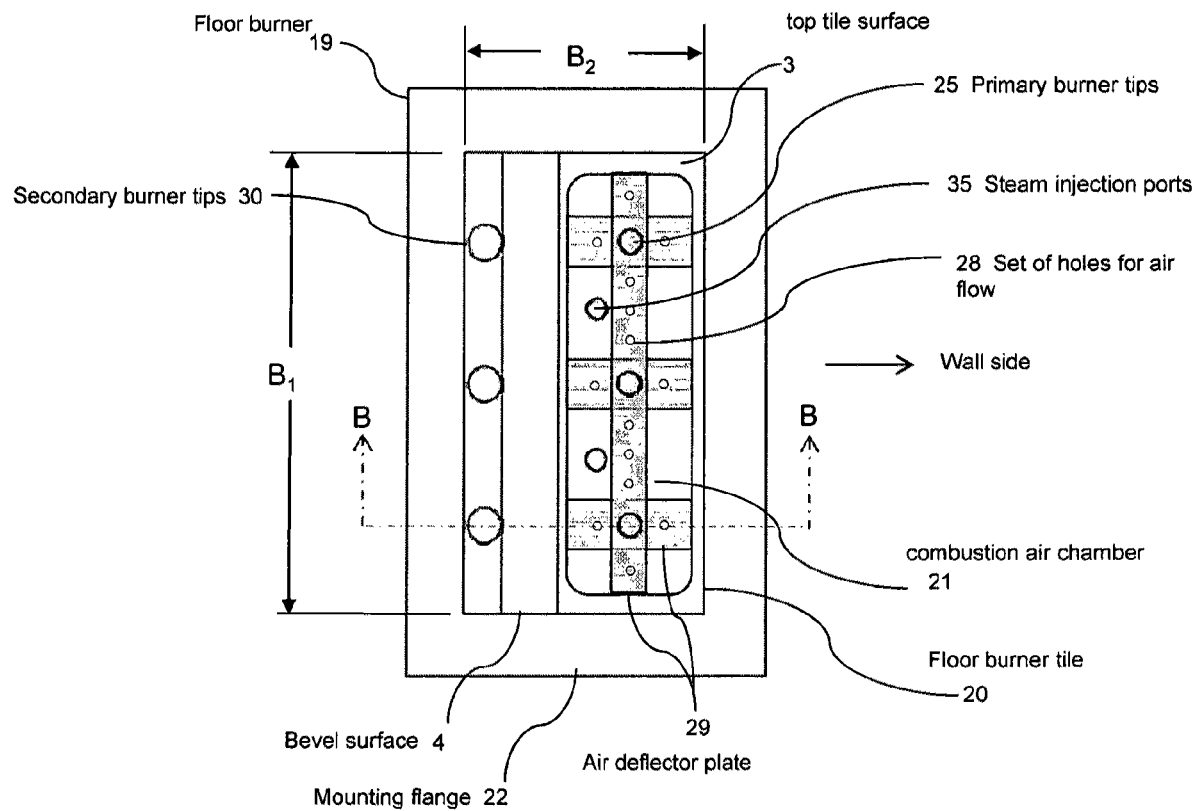
FIG. 5 is a plan view of a floor burner showing the burner tips, steam injection ports and other components.

FIGS. 5 and 6 are a plan and a sectional view, respectively, of floor burner 19 comprising floor burner tile 20 supported by mounting flange 22. Floor burner 19 comprises three primary burner tips 25, three secondary burner tips 30 and two steam injection ports 35, air deflector plate 29 attached to and supporting the three primary burner tips. Air deflector plate 29 includes a set of holes 28 to stabilize the fresh air flow near the primary burner tips.

Referring to FIG. 6, floor burner tile 20 is positioned in floor 8 adjacent to wall 6 so that secondary gas burner tips 30 are positioned near the level of top floor surface 5. Floor burner tile 20 includes bevel surface 4 leading from top floor surface 5 up to and connected with top tile surface 3. Floor burner tile 20 further includes a rectangular combustion air chamber 21 which is a cavity connecting top floor surface 5 to the bottom of the floor burner tile near bottom floor surface 2. Primary burner tips 25 and air deflector plate 29 are positioned below and near to top floor surface 5 inside combustion air chamber 21.

Top tile surface 3 is preferably between about 5 inches and 9 inches above top floor surface 5. Secondary gas burner tips 30 extend between about 1 inch and about 2 inches above top floor surface 5. The horizontal portion of air deflector plate 29 is positioned between about 1.5 and 2.5 inches below top tile surface 5 with the primary burner tips mounted directly above them. Steam injection ports 35 are preferably positioned at about the same height as primary burner tips 25. The steam sprays upward and spreads out into a cone-like flow when it exits the steam injection ports.

Floor burner 19 further comprises plenum assembly 41 attached underneath floor burner tile 20, air intake muffler assembly 45 attached to plenum assembly 41 and ultimately to combustion air chamber 21. Air intake muffler assembly 45 further comprises air intake control baffle 43 and air intake opening 42 through which ambient fresh air 49 can be controllably drawn through air intake muffler assembly 45, combustion air chamber 21, through and around air deflector plate 29, to the primary gas burner tips.

An example of a suitable floor burner is the PXMR-60M from John Zink Company, Tulsa, Okla. with modifications to the plenum assembly performed by the inventor in accordance with preferred embodiments as described herein.

Fuel and steam is supplied to the floor burner via supply risers comprising a set of secondary gas supply risers 46 connected between the secondary gas burner tips and secondary fuel supply line 52; set of primary fuel supply risers 47 connected between the primary burner tips and primary fuel supply lines 51; and, set of steam supply risers 48 connected between steam injection ports 35 and steam supply line 53. The fuel supply lines and steam supply line are supported by manifold assembly 44 attached to the plenum assembly.

Steam control valve 58 connected to steam supply line 53 controls the flow of steam to the right and left banks of floor burners. Primary fuel control valves 56 connected to primary fuel supply lines 51 controls the flow of fuel gas to the primary burner tips of the right and left banks of floor burners. Secondary fuel control valves 57 connected to secondary fuel supply line 52 controls the flow of fuel gas to the secondary burner tips of the right and left banks of floor burners.

FIGS. 7A-7D are block diagrams showing the preferred fuel gas flow arrangement. The fuel gas flows from a set of holes drilled in each burner tip. Arrows indicate the position of a hole and flow direction of fuel gas from the hole. A dot indicates fuel gas flow in a direction out of the paper. The primary burner tips have a set of holes of diameter between about 0.05 inches and about 0.110 inches. The secondary burner tips have a set of holes of diameter between about 0.10 inches and about 0.25 inches.

Left secondary burner tip 31L, central secondary burner tip 31C and right secondary burner tip 31R have holes configured to inject fuel from top floor surface 5 towards bevel surface 4 of the floor burner tile towards corresponding primary burner tips. Left primary burner tip 26L has a set of holes configured to inject fuel gas from below top tile surface 3 to directions: horizontal towards and away from wall 6 along the air deflector plate; horizontal towards the right along the air deflector plate; vertical; and, vertically at an angle towards wall 6. Central primary burner tip 26C has a set of holes configured to inject fuel gas from below top tile surface 3 to directions: horizontal towards and away from wall 6 along the air deflector plate; horizontal towards the left and right along the air deflector plate; vertical; and, vertically at an angle towards wall 6. Right primary burner tip 26R has a set of holes configured to inject fuel from below top tile surface 3 to directions: horizontal towards and away from wall 6 along the air deflector plate; horizontal towards the left along the air deflector plate; vertical; and, vertically at an angle towards wall 6.

The geometry of the air deflector plate is consistent with the drawings, having a width of between 2.5 inches and 3.5 inches; the angle of the air shield from each primary burner tip to the top tile surface is between 25 degrees and 35 degrees to the vertical.

Figure 7A:
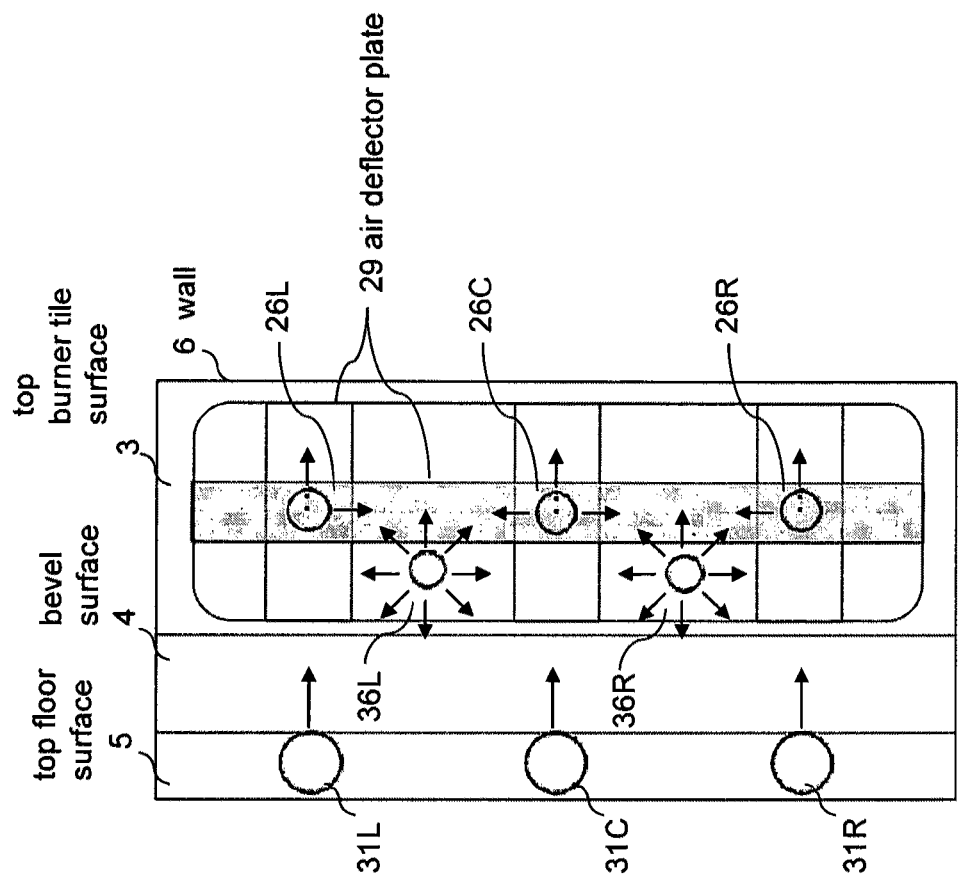

FIGS. 7A, 7E and 7F show the preferred steam flow for steam injection ports including left steam port 36L and right steam port 36R, which are configured to inject steam into full cone steam flows 37L and 37R, respectively, from above top tile surface 3 with a cone aperture angle Q preferably between 50 degrees and 70 degrees. The steam preferably disperses to a height $H_C$ of between 12 inches and 18 inches above the steam injection ports.

An example of a suitable steam nozzle for the steam ports is the DeflectoJet model 8686 spray nozzle from Spraying Systems Company of Wheaton, Ill.

In operation, fuel gas is consumed and burned by the floor burners and the wall burners to create a heat flux through a horizontal cross-section of the firebox of between about 250,000 and about 400,000 BTU/sq. ft. As a result, the firebox achieves temperatures in the range of about 1800° F. (1000° C.) to about 2200° F. (1200° C.) degrees Celsius and the feedstock hydrocarbons are heated to temperatures of between about 1300° F. (700° C.) and about 1800° F. (1000° C.) as they flow downward through the inlet radiant tube sections and then back up through the outlet radiant tube sections. Exemplary fuel and heat flows are provided in Table 1.

TABLE 1

EXEMPLARY FUEL AND HEAT FLOWS

| Furnace firing data | Wall burners | Floor burners | Total | Units |
|---|---|---|---|---|
| Fuel gas LHV | 22800 | 22800 | 22800 | BTU/lb |
| Fuel gas flow rate | 1210 | 8880 | 10090 | lb/hr |
| QQ (heat production) | 28 | 202 | 230 | MMBTU/hr |

TABLE 1-continued

EXEMPLARY FUEL AND HEAT FLOWS

| Floor burner data | Primary burner tips | Secondary burner tips | Total | Units |
|---|---|---|---|---|
| Fuel gas flow - floor burners | 1776 | 7104 | 8880 | lb/hr |
| Fuel gas flow - per burner tile | 98.7 | 394.7 | 493.3 | lb/hr |
| Fuel gas flow - per hole | 6.2 | 131.6 | — | lb/hr |
| Fuel gas flow - "L" tips | 30.8 | 131.6 | 162.4 | lb/hr |
| Fuel gas flow - "C" tips | 37.0 | 131.6 | 168.6 | lb/hr |
| Fuel gas flow - "R" tips | 30.8 | 131.6 | 162.4 | lb/hr |
| QQ per floor burner tile | 2.25 | 9.00 | 11.25 | MMBtu/hr |

Figure 8:
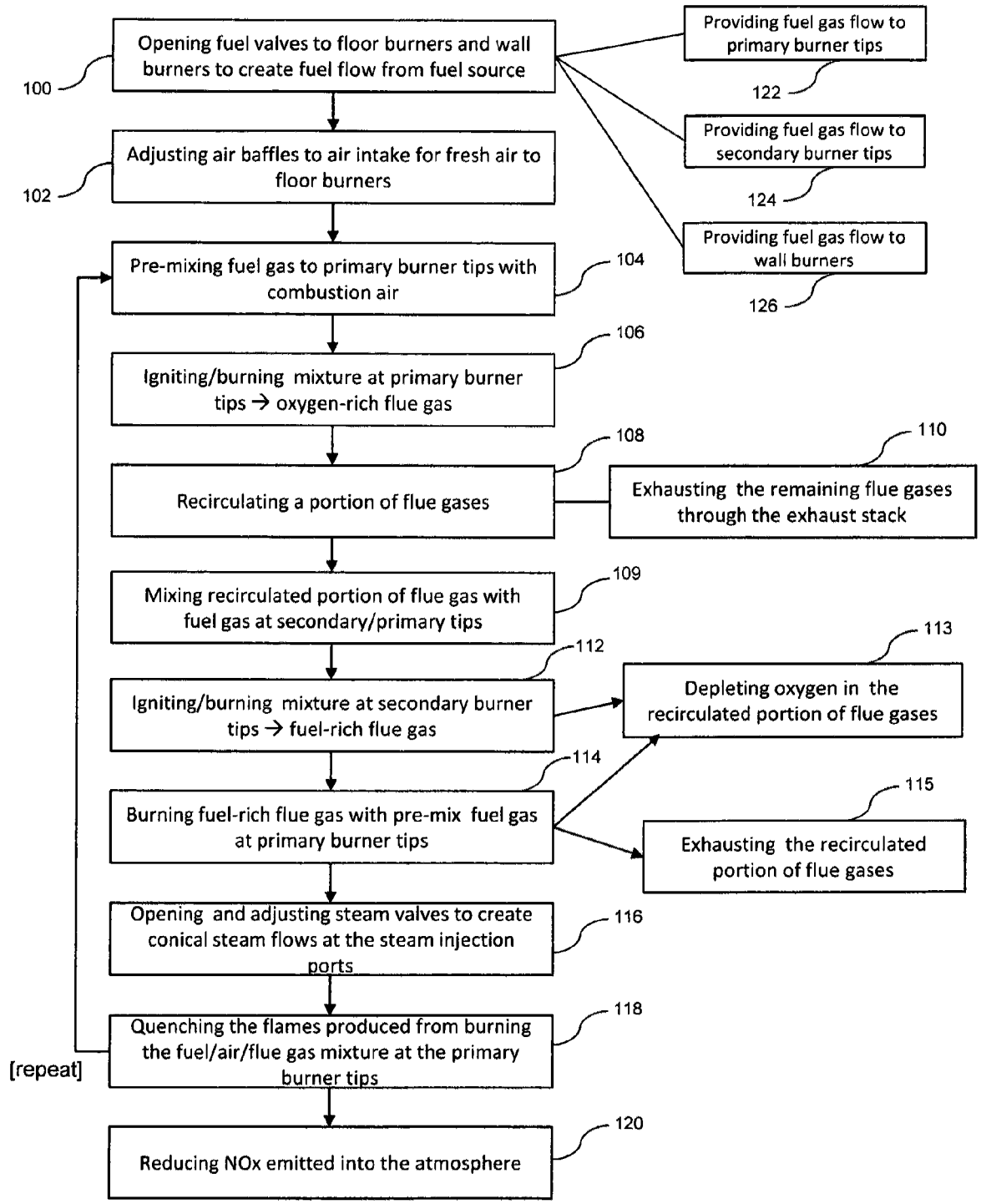
FIG. 8 is a flow chart diagram of a preferred method to reduce mono-nitrogen oxide emissions in a hydrocarbon cracking furnace.

FIG. 8 is a flow chart diagram of a method of operation to reduce NOx emissions. The steps of FIG. 8 are best understood with reference to FIG. 9. In step 100, the, primary fuel control valves and secondary fuel control valves are opened and fuel gas is supplied through fuel supply lines from the fuel gas source to the primary burner tips 225 at step 122 and to the secondary burner tips 230 at step 124. The fuel gas is ignited with the aid of pilot burners situated nearby.

Wall burners are not shown in FIG. 9 and the elements of FIG. 9 are not scaled proportionally. Some embodiments do not utilize wall burners, such that 100% of the fuel gas flows to the floor burners. When wall burners are utilized in other embodiments, between about 75% and 95% of the fuel gas flows to the floor burners and the remaining fuel gas flows to the wall burners. Wall burner fuel control valves are opened once the firebox is hot, then fuel gas is supplied through fuel supply lines from the fuel gas source to the wall burners at step 126 which mixes with fresh air educed by wall burner orifices to ignite without the aid of a pilot light.

Fuel gas flow to the floor burners is consumed at primary burner tips 225 and secondary burner tips 230 in a ratio of about 20% (primary) to 80% (secondary). In step 102, air intake control baffles are adjusted to provide intake of fresh air 222. At step 104, the fresh air is pre-mixed with the fuel gas as it flows from primary burner tips 225 where, in step 106, the mixture is burned at sub-stoichiometric with respect to fuel gas (fuel-lean) thereby producing a primary flame 226 and primary flue gases 227 that contain $O_2$ at about 2% by volume (oxygen-rich flue gases). Primary flame 226 is generally directed toward the central tip and toward the furnace wall 206 so that radiant heat can reflect from the wall toward the hybrid radiant tube sections.

At step 108, the furnace geometric measurements and locations of the various burners contribute to internal recirculation of a portion of the oxygen-rich flue gases as recirculated flue gas 250 flowing up the side of the furnace walls and back down to the floor surface 205, along beveled surface 204 and over top tile surface 203 of the floor burner. It is to be understood that the recirculation, mixing and burning of internal flue gas helps to lower NOx emissions. At step 110, remaining flue gases 240 from primary flue gases 227 escape via the exhaust stack.

At step 109, the fuel gas flow at the secondary burner tips mixes with the oxygen-rich flue gases of recirculated flue gas 250 without the addition of fresh air. At step 112, the fuel and flue gas mixture at secondary burner tips 30 burns sub-stoichiometric with respect to oxygen (fuel-rich), contributing to fuel-rich secondary flames 231 and secondary flue gases 232. At step 113, oxygen is depleted from the recirculated flue gases 250 as a result of burning in step 112. Recirculated flue gases 250, depleted of oxygen, flow up beveled surface 204 to mix with and to draw the fuel-rich secondary flames and secondary flue gases 232 towards primary burner tips 225. At step 114, recirculated flue gases 250 and secondary flue gases 232 are combined with the primary flame 226 and further burned along with the primary fuel gas. At step 115, recirculated flue gases 250, with a depleted level of oxygen, flow to the exhaust stack as exhaust gases 245.

The floor burners provide heat to the lower half of the radiant tubes. Additional heat is added to the top portion of the tubes via the left and right wall burners. The wall burners use fuel gas pressure and flow across an orifice to draw ambient air into a set of wall burner tips. As combustion occurs near the set of wall burner tips, the resulting flames provide heat radiating away from the wall surfaces.

The steam injection valve is opened and adjusted in step 116, to spray steam, at a rate of between about 0.25 to 1.0 lb of steam per lb of fuel gas, into a full conical pattern of steam 237 at the location of the steam injection ports 235 on each floor burner near the primary burner tip (as in FIGS. 5, 6, 7E and 7F).

The full conical pattern of steam makes contact with the primary flame 226, and in step 118, cools the secondary flue gases and secondary excess fuel, and quenches the primary flame, reducing the primary flame temperature. Steps 104 through 118 are repeated, describing a continuous mixing, burning, and flue gas recirculating process which evolves the flue gases into an equilibrium mixture of combustion products including NOx. The reduced primary flame temperatures in combination with the two-stage secondary-primary fuel firing and flue gas recirculation (FGR) reduces NOx emissions into the flue gases exhausted to the atmosphere as measured at pre-defined sampling points within the exhaust stack in step 120.

EXAMPLE 1

Prior Art Cracking Furnace with No Steam Added

A prior art cracking furnace was observed. The first prior art cracking furnace is capable of operating with NOx concentrations of 71 ppm NOx (volume and dry basis) with the oxygen corrected to 3.0 volume % on a dry basis. Results of NOx emission tests are tabulated in Table 2, showing NOx emissions in terms of the NOx concentration (NOx ppm) in the first column, NOx emission rate (lb NOx/hr) in a second column and NOx intensity in lb NOx/MMBTU(LHV) in the third column.

With the furnace firing at 200 MMBtu/hr based on lower heating value (LHV) for the fuel gas, the stack emissions are 17.6 lbs/hr, which gives a NOx ratio of about 0.088 lbs NOx/MMBtu(LHV). The fuel rate for 200 MMBtu/hr firing rate is about 10,000 lbs/hr for the fuel gas with an LHV of about 24,000 Btu/lb.

TABLE 2

|  | NOx ppm | NOx lb/hr | Fuel LHV BTU/lb | lb NOx per MM BTU | steam lbs/hr | steam to fuel gas ratio | CO ppm | compare NOx ppm to example 1 | compare lb NOx/ MMBTU to example 1 |
|---|---|---|---|---|---|---|---|---|---|
| Example 1 - no steam injection | 71 | 17.6 | 24100 | 0.088 | 0 | 0 | 0 | — | — |
| Example 2 - steam pre-mixed with fuel gas in risers | 59 | 15.0 | 24900 | 0.073 | 1200 | 0.15 | 3.4 | −17% | −17% |

EXAMPLE 2

Cracking Furnace with Prior Art Steam Arrangement

The same prior art cracking furnace as in example 1 was observed in which steam was injected into the primary fuel risers and pre-mixed with fuel gas via steam injection ports placed in each of the primary and secondary fuel risers prior to combustion at the burners. Steam flow to the primary burner tips was about 1,200 lbs/hr (0.15 lbs steam per pound of fuel gas) with sufficient fuel gas flow to accomplish about a 205 MMBtu/hr firing rate. Results of NOx emission tests are tabulated in Table 2 as Example 2, showing NOx emissions in terms of the NOx concentration (NOx ppm) in the first column, NOx emission rate (lb NOx/hr) in a second column and NOx intensity in lb NOx/MMBtu(LHV) in the third column.

For the cracking furnace of example 2, the steam addition is about 1,200 lbs/hr. The reduced NOx concentration was observed at 59 ppm corresponding to NOx emissions of 15.0 lbs/hr NOx and 0.073 lbs/MMBtu(LHV). According to Table 2, about a 17% reduction of NOx emission rate was observed in comparison to the lowest emissions of the first ethylene cracking furnace, corresponding to between a 17% reduction in NOx intensity.

When steam is pre-mixed with fuel gas, it causes an additional pressure drop across the small holes in the primary burners' tips. The effect is to reduce the fuel injection rate. To compensate, the diameter of the small holes are increased over methods that do not pre-mix the fuel and steam. Besides the additional pressure drop, another negative impact is an alteration of the burner flame pattern leading to additional generation of coke deposits and pollutants within the radiant tubes and further leading to shorter operational run times between decoking and cleaning of the radiant tubes. Once compensated, the steam is mixed with the fuel gas in the fuel gas risers prior to the combustion process thereby lowering the flame temperature and the NOx emissions. In this method, the ratio of steam to fuel gas cannot be varied.

Because steam is mixed with fuel and carried in the fuel gas lines and fuel risers, the cracking furnace of the second example required that fuel gas lines and risers be cleaned periodically due to fuel gas condensation.

EXAMPLE 3

Cracking Furnace—with no Steam Injected

A second cracking furnace was deployed where the steam injection ports were included as per the present invention. The furnace design of Example 3 is different than that of Examples 1 and 2. Furthermore, Example 3, while upgraded to include the steam arrangement of the preferred embodiment, was operated without steam to arrive at a baseline case to test the improvements due to the present invention. The results of Example 3 and the remaining examples 4-6 are presented in Table 3.

For the cracking furnace of Example 3, the steam addition is zero. The NOx concentration was observed at 64 ppm corresponding to NOx emissions of 18.8 lbs/NOx and 0.082 lbs/MMBtu(LHV). The differences between Examples 1 and 3 with zero steam addition are due to differences in furnace design. Even though the invention is demonstrated with one exemplary furnace design, there is no reason why the invention could not be applied to a prior art furnace design.

TABLE 3

|  | NOx ppm | NOx lb/hr | Fuel LHV BTU/lb | lb NOx per MM BTU | steam lbs/hr | steam to fuel gas ratio | CO ppm | compare NOx ppm to example 1 | compare lb NOx/ MMBTU to example 1 |
|---|---|---|---|---|---|---|---|---|---|
| Example 3 - no steam addition | 64 | 18.8 | 23100 | 0.082 | 0 | 0.00 | 0.1 | — | — |
| Example 4 - with steam addition | 54 | 15.7 | 23300 | 0.069 | 2020 | 0.21 | 0.1 | −15% | −16% |
| Example 5 - with steam addition | 42 | 11.5 | 24600 | 0.052 | 3980 | 0.45 | 0.1 | −34% | −37% |
| Example 6 - with steam addition | 36 | 9.2 | 24600 | 0.045 | 3980 | 0.49 | 6.6 | −43% | −45% |

EXAMPLE 4

Cracking Furnace with Steam Arrangement of Preferred Embodiment

The cracking furnace of Example 4 is the same cracking furnace as Example 3 with steam added at a rate of about 2000 lbs/hr (with 0.21 lbs steam per pound of fuel gas). The reduced NOx concentration was observed at 54 ppm corresponding to NOx emissions of 15.7 lbs/hr and 0.069 lbs/MMBtu(LHV). The firing rate of the cracking furnace of Example 4 is about 230 MMBtu(LHV). According to Table 3, about a 13% reduction of NOx emission rate was observed in comparison to the zero steam case of Example 3 corresponding to a 16% reduction in NOx intensity relative to Example 3.

EXAMPLE 5

Cracking Furnace with Steam Arrangement of Preferred Embodiment

The cracking furnace of Example 5 is the same cracking furnace as Example 3 with steam added at a rate of about 4000 lbs/hr with 0.45 lbs steam per pound of fuel gas. The reduced NOx concentration was observed at 42 ppm corresponding to NOx emissions of 11.5 lbs/hr and 0.052 lbs/MMBtu(LHV). The firing rate of the cracking furnace of Example 5 is about 220 MMBtu(LHV). According to Table 3, about a 34% reduction of NOx emission rate was observed in comparison to the zero steam case of Example 3 corresponding to a 37% reduction in NOx intensity relative to Example 3.

EXAMPLE 6

Cracking Furnace with Steam Arrangement of Preferred Embodiment

The cracking furnace of Example 6 is the same cracking furnace as Example 3 with steam added at a rate of about 4000 lbs/hr with 0.49 lbs steam per pound of fuel gas. The reduced NOx concentration was observed at 36 ppm corresponding to NOx emissions of 9.2 lbs/hr and 0.045 lbs/MMBtu(LHV). The firing rate of the cracking furnace of Example 6 is about 200 MMBtu(LHV). Example 6 shows the impact of how NOx emissions can be further lowered by controlling and increasing CO emissions from about 0.1 ppm to about 7 ppm. According to Table 3, about a 39% reduction of NOx emission rate was observed in comparison to the zero steam case of Example 3 corresponding to a 45% reduction in NOx intensity relative to Example 3.

The preferred method for NOx reduction in Examples 4-6 gave better performance for lowering NOx emissions than Examples 1-3 in which the preferred method was not utilized. Examples 1 and 2 indicate that mixing steam into the fuel gas lines can provide for about a 17% improvement in NOx emissions, while Examples 3-5 indicate that flowing steam as in the preferred embodiments can provide for up to a 34% reduction in NOx emissions.

In the preferred embodiments, the steam, fuel flow rates and CO production are independent adjustments. As indicated in the improvements between Example 4 and Examples 5 and 6, NOx is further lowered by increasing steam flow relative to fuel flow, albeit at a higher consumption of fuel necessary to achieve the same overall heat flux. Steam flows up to about 1.0 lb steam per lb fuel gas are possible. As fuel prices vary, a balance of NOx reduction and fuel economics is readily achieved with the methods and apparatus of the present invention. As fuel prices vary, a balance of NOx reduction and fuel economics is readily achieved with the methods and apparatus of the present invention.

The preferred method of NOx reduction caused few issues and has been consistent in its performance. The preferred method and apparatus embodiment described herein are amenable to an upgrade process to refurbish an existing hydrocarbon cracking furnace to a preferred cracking furnace to reduce NOx emissions.

The cracking furnace used in Examples 4, 5 and 6 has advantages over prior art NOx reduction methods and apparatus. In a first advantage, no modification to the drill size openings for the primary burner tip holes is required. A second advantage is that there is no need to increase fuel gas pressure to achieve the ultra low NOx targets. In one aspect of the preferred cracking furnace, the steam spray nozzle is not directly exposed to the flame temperatures and spreads the steam over an area around each of two primary burner tips.

In another advantage, where there was previously incomplete combustion and subsequent formation of CO, the preferred steam injection will help drive the combustion to completion and reduce formation of CO. However, if the formation of CO is not an issue from an environmental perspective, the preferred embodiment will permit the operator of a furnace another degree of freedom in which to control the furnace NOx levels.

In another aspect of the preferred cracking furnace, the relative rates of consumption are preferably set so that 80% to 85% of the fuel gas is consumed by the secondary burner tips and the remaining 15% to 20% of the fuel gas is consumed by the primary burner tips. In yet another aspect of the preferred cracking furnace, there were no negative corrosive impacts on the fuel gas lines.

Although enabling embodiment of the present disclosure has been described in detail, those skilled in the art should understand that various changes, substitutions and alterations may be made without departing from the spirit and scope of the present disclosure. For example, the fuel gas composition may have a different LHV or contain a different amount of methane than a preferred embodiment. Also, the dimensions may be scaled along with the number of floor and wall burners to achieve a similar heat flux. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A method for reducing mono-nitrogen oxide emissions from a hydrocarbon cracking furnace having a firebox with a floor, two side walls, two end walls and a roof with an exhaust stack for exhausting flue gases, the method including the steps of:

providing a set of floor burners disposed on the floor adjacent to the two side walls;

providing a set of hybrid radiant tubes near a vertical central plane bisecting each of the two end walls;

providing a source of fuel gas;

providing a source of steam;

providing an adjustable source of fresh air;

providing the set of floor burners with a set of primary burner tips, connected to the source of fuel gas, and a set of secondary burner tips, connected to the source of fuel gas, where the secondary burner tips are positioned at a height below the set of primary burner tips and fixed between the set of primary burner tips and the vertical central plane;

providing a set of steam injection ports, connected to the source of steam, placing the set of steam injection ports between the set of secondary burner tips and the primary burner tips;

flowing a first fuel gas flow from the source of fuel gas to the set of primary burner tips at a flow rate F1;

flowing a second fuel gas flow from the source of fuel gas to the set of secondary burner tips at a flow rate F2 resulting in a combined flow rate F=F1+F2;

flowing steam from the source of steam at a flow rate S to the set of steam injection ports to create a set of conical steam flows;

adjusting the flow rate S to between about one-fourth of the combined flow rate F to about equal to the combined flow rate F;

adjusting a fresh air flow from the source of fresh air to the set of primary burner tips;

mixing the first fuel gas flow with the fresh air flow as a first mixture which is sub-stoichiometric with respect to fuel gas;

burning the first mixture to create a first set of flames and a first flue gas;

contacting the first set of flames with the set of conical steam flows;

recirculating a portion of the first flue gas to mix with the second fuel gas flow as a second mixture containing a sub-stoichiometric amount of oxygen;

burning the second mixture at the secondary burner tips to create a second set of flames and a second flue gas;

burning the second flue gas along with the first mixture at the primary burner tips to contribute to the first flue gas;

adjusting the first and second sets of flames to deliver a total heat flux through a horizontal cross-section of the firebox at between about 250,000 and about 400,000 BTU/ft$^2$; and, exhausting the first flue gas, the second flue gas, and the portion of the first flue gas through the exhaust stack as a combined flue gas whereby the combined flue gas has a reduced mono-nitrogen oxide concentration.

2. The method of claim 1 including the steps of:

providing a set of wall burners disposed along the two side walls;

flowing a third fuel gas flow from the source of fuel gas to the wall burners at a flow rate F3;

burning the third fuel gas flow to create a third set of flames and a third flue gas;

adjusting the first, second and third sets of flames to deliver a total heat flux through a horizontal cross-section of the firebox at between about 250,000 and about 400,000 BTU/ft$^2$; and, exhausting the first flue gas, the second flue gas, the third flue gas and the portion of the first flue gas through the exhaust stack as a combined flue gas whereby the combined flue gas has a reduced mono-nitrogen oxide concentration.

3. The method of claim 1 including the additional steps of:

providing a source of feedstock for hydrocarbon cracking, connected to the hybrid radiant tubes;

providing a heat exchanger, connected to the hybrid radiant tubes;

flowing the feedstock into the hybrid radiant tubes;

heating the hybrid radiant tubes with the total heat flux;

cracking the feedstock molecules into a desired hydrocarbon product in a cracking process;

flowing the desired hydrocarbon product into the heat exchanger;

quenching the cracking process; and flowing the desired hydrocarbon product away from the firebox.

4. The method of claim 3 including the step of selecting an olefin as the desired hydrocarbon product.

5. The method of claim 4 including the additional step of selecting at least one olefin for the hydrocarbon product from the group of ethylene, propylene and butadiene.

6. The method of claim 3 including the step of selecting an aromatic as the desired hydrocarbon product.

7. The method of claim 6 including the additional step of selecting benzene as the aromatic.

8. The method of claim 3 including the additional step of selecting at least one of the groups of ethane, butane, propane, naphtha and gas oil as the feedstock.

9. The method of claim 1 including the additional step of adjusting the set of conical steam flows to a height of between 12 inches and 18 inches above the primary burner tips.

10. A method for reducing mono-nitrogen oxide emissions from a hydrocarbon cracking furnace having a firebox with a floor, two side walls, two end walls, a roof and an exhaust stack for exhausting flue gases, the method comprising the steps of:

providing a set of N floor burners disposed on the floor adjacent to the two side walls;

providing a set of M wall burners disposed along the two side walls;

providing a set of hybrid radiant tubes near a vertical central plane bisecting each of the two end walls;

providing a source of fuel gas;

providing a source of steam;

attaching a set of 3N primary burner tips, connected to the source of fuel gas, to the set of N floor burners;

attaching a set of 3N secondary burner tips, connected to the source of fuel gas, to the set of N floor burners at a height below the set of 3N primary burner tips and at a position between the set of 3N primary burner tips and the vertical central plane;

attaching a set of 2N steam injection ports, connected to the source of steam, to the set of N floor burners between the set of 3N secondary burner tips and the 3N secondary tips;

delivering a combined fuel gas flow into the firebox with a combined flow rate F;

delivering a steam flow into the set of 2N steam injection ports with a flow rate S of between about one-fourth and about equal to the combined flow rate F;

dividing the combined fuel gas flow into a first flow to the set of M wall burner burners with flow rate F1 and into a second flow to the set of N floor burners with flow rate F2, where F1/F2 is between zero and about 0.25;

subdividing the second flow into a third flow to the set of 3N primary burner tips with flow rate F3 and a fourth flow to the set of 3N secondary burner tips with flow rate F4, where F3/F4 is between about 0.1 and about 0.2;

delivering a fresh air flow to the N floor burners by adjusting an air intake baffle connected to ambient air;

mixing the fresh air flow with the third flow;

burning fuel gas from the first flow to create a first set of flames and a first flue gas;

burning fuel gas from the third flow to create a second set of flames and a second flue gas;

burning fuel gas from the fourth flow to create a third set of flames and a third flue gas;

recirculating a portion of the second and third flue gases as a recirculating flue gas;

spraying the steam flow from the 2N steam injection ports into a set of 2N conical steam flows which make contact with the second set of flames thereby reducing the mono-nitrogen oxide emissions into the first, second, third and recirculating flue gases; and, exhausting the first, second, third and recirculating flue gases through the exhaust stack.

11. The method of claim 10 including the step of selecting M=0 wherein there are no wall burners included in the firebox.

12. The method of claim 10 including the additional step of adjusting the conical steam flows to a height of between 12 inches and 18 inches above the primary burner tips.

13. The method of claim 10 including the additional step of adjusting the combined fuel gas flow into the firebox to between about 0.25 lb/hr and about 0.35 lb/hr per cubic foot of volume of the firebox.

14. The method of claim 10 including the additional step of delivering the total heat flux through a horizontal cross-section of the firebox of between 250,000 and 400,000 BTU/ft$^2$.

15. The method of claim 10 including the steps of:
further subdividing the third flow into a left primary burner flow with flow rate PL, a right primary burner flow with flow rate PR, and center primary burner flow with flow rate PC, where PL is about the same as PR and PC/PL is between about 1.1 and 1.3; and,
further subdividing the fourth flow into a left secondary burner flow, a right secondary burner flow, and a center secondary burner flow with about equal flow rates.

16. The method of claim 10 including the additional steps of:
providing a source of feedstock for hydrocarbon cracking, connected to the hybrid radiant tubes;
providing a heat exchanger, connected to the hybrid radiant tubes;
flowing the feedstock into the hybrid radiant tubes;
heating the hybrid radiant tubes with the total heat flux;
cracking the feedstock molecules into a desired hydrocarbon product in a cracking process;
flowing the desired hydrocarbon product into the heat exchanger;
quenching the cracking process; and
flowing the desired hydrocarbon product away from the firebox.

17. The method of claim 16 including the additional step of selecting at least one of the groups of ethane, butane, propane, naphtha and gas oil as the feedstock.

18. The method of claim 16 including the additional step of selecting an olefin as the hydrocarbon product.

19. The method of claim 18 including the additional step of selecting at least one olefin from the group of ethylene, propylene and butadiene as the hydrocarbon product.

20. The method of claim 16 including the additional step of selecting an aromatic as the hydrocarbon product.

21. The method of claim 20 including the additional step of selecting benzene as the aromatic.

22. A method for upgrading an existing hydrocarbon cracking furnace to reduce mono-nitrogen oxide emissions where the hydrocarbon cracking furnace has a firebox with a floor, two side walls, two end walls and a roof with an exhaust stack for exhausting flue gases, a set of floor burners attached to the floor adjacent to the two side walls, a source of fuel gas, and a set of hybrid radiant tubes situated near a vertical central plane bisecting each of the two end walls, the set of hybrid radiant tubes attached to a feedstock source at a first end and a heat exchanger on a second end, the method comprising the steps of retrofitting and operating the hydrocarbon cracking furnace according to the sub-steps:
providing a set of primary burner tips on the set of floor burners above the level of the floor, connected to the source of fuel gas;
providing a set of secondary burner tips on the set of floor burners at about the level of the floor, fixed between the set of primary burner tips and the vertical central plane, connected to the source of fuel gas;
providing an adjustable source of fresh air;
providing a source of steam;
adding a set of steam injection ports to the set of floor burners, between the set of secondary burner tips and the primary burner tips at about the height of the primary burner tips,
connecting the set of steam injection ports to the source of steam;
flowing fuel gas into a first fuel gas flow from the source of fuel gas to the set of primary burner tips at a flow rate F1;
flowing the fuel gas into a second fuel gas flow to the set of secondary burner tips at a flow rate F2;
flowing steam from the source of steam at a mass flow rate S to the set of steam injection ports to create a set of conical steam flows, where the mass flow rate S is between about one-fourth and about equal to the combined flow rate F=F1+F2;
adjusting a fresh air flow to flow from the source of fresh air to the set of primary burner tips;
mixing the first fuel gas flow with the fresh air flow as a first mixture containing a sub-stoichiometric amount of fuel gas;
burning the first mixture to create a first set of flames and a first flue gas;
contacting the first set of flames with the set of conical steam flows;
recirculating a portion of the first flue gas as a recirculating flue gas;
mixing the second fuel gas flow with the recirculated fraction of first flue gas as a second mixture containing a sub-stoichiometric amount of oxygen;
burning the second mixture to create a second set of flames and a second flue gas;
burning the second flue gas along with the first mixture at the primary burner tips to contribute to the first flue gas; and,
exhausting the first flue gas, second flue gas, third flue gas and recirculating flue gas through the exhaust stack as an exhausted flue gas with reduced mono-nitrogen oxide emissions.

23. The method of claim 22 further comprising the steps of:
providing a set of wall burners attached to the two side walls,
flowing the fuel gas into a third fuel gas flow into the wall burners at a flow rate F3;
burning the third fuel gas to create a third set of flames and a third flue gas; and,
exhausting the first flue gas, second flue gas, third flue gas and recirculating flue gas through the exhaust stack as an exhausted flue gas with reduced mono-nitrogen oxide emissions.

24. The method of claim 22 including the step of adjusting the first and second sets of flames to deliver a total heat flux through a horizontal cross-section of the firebox of between about 250,000 and about 400,000 BTU/ft$^2$.

25. The method of claim 23 including the step of adjusting the first, second and third sets of flames to deliver a total heat flux through a horizontal cross-section of the firebox of between about 250,000 and about 400,000 BTU/ft².

26. A hydrocarbon cracking furnace producing low mononitrogen oxide emissions comprising:
    a firebox with a floor, two side walls, two end walls and a roof;
    an exhaust stack connected to the roof for exhausting flue gases from the firebox;
    a set of floor burners attached to the floor adjacent to the two side walls;
    a set of hybrid radiant tubes positioned near a vertical central plane bisecting each of the two end walls and further attached to a feedstock source at one end and a heat exchanger on the other end;
    a source of fuel gas;
    a source of steam;
    the set of floor burners including a set of burner tiles having a top tile surface adjacent to the side wall, a lower surface positioned between the top tile surface and the vertical central plane, a beveled surface connecting the lower surface to the top tile surface where the top tile surface is between about 4 inches and about 9 inches above the floor and the lower surface is at the level of the floor;
    the set of burner tiles further including a chamber;
    a set of primary burner tips attached to the set of burner tiles inside the chamber at a height of between about 3 inches below the top tile surface and about the level of the top surface, and connected to the source of fuel gas;
    an air intake baffle connected between ambient air and the chamber;
    a set of secondary burner tips attached to the set of burner tiles at the lower surface and extending to a height of between about 3 inches above the lower surface and about the level of the lower surface, the set of secondary burner tips connected to the source of fuel gas;
    a set of steam injection ports, connected to the source of steam, and further attached to the set of burner tiles between the set of primary burner tips and the set of secondary burner tips at a height about the same as the set of primary burner tips;
    a first fuel gas flow from the source of fuel gas to the set of primary burner tips having a flow rate F1;
    an ambient air flow to the set of primary burner tips from the ambient air sufficient to enable a fuel-lean combustion at the primary burner tips;
    a second fuel gas flow from the source of fuel gas to the set of secondary burner tips having a flow rate F2;
    a steam flow at a flow rate S from the source of steam to the set of steam injection ports and emerging from the set of steam injection ports into the firebox as a set of conical steam flows, where the flow rate S is between about one-fourth and about equal to the combined flow rate F=F1+F2;
    a recirculating flue gas flow from the combustion of the first and second fuel gas flows, recirculated to the set of secondary burners;
    a set of pilot burners attached to the set of floor burners in proximity to the primary burner tips and the secondary burner tips and attached to the wall burners, the set of pilot burners connected via a set of pilot valves to the source of fuel gas;
    a feedstock flow from the feedstock source into the hybrid radiant tubes;
    a hydrocarbon product flow from the hybrid radiant tube into the heat exchanger;
    a set of primary flames generated by fuel-lean combustion at each of the set of primary burner tips;
    a set of secondary flames generated by fuel-rich combustion at each of the set of secondary burner tips; and,
    wherein each conical steam flow of the set of conical steam flows is in contact with at least two primary flames in the set of primary flames.

27. The hydrocarbon cracking furnace of claim 26 wherein each conical steam flow of the set of conical steam flows has a cone aperture of between about 50 degrees and 70 degrees.

28. The hydrocarbon cracking furnace of claim 26 wherein the set of conical steam flows spray upwards to a height of between about 12 inches and 18 inches above the set of steam injection ports.

29. The hydrocarbon cracking furnace of claim 26 where the heat exchanger is a transfer line heat exchanger.

30. The hydrocarbon cracking furnace of claim 26 where the proportion of the number of steam injection ports to the number of primary burner tips is between 1:4 and 2:1.

31. The hydrocarbon cracking furnace of claim 30 where there are two steam injection ports for every three primary burner tips.

32. The hydrocarbon cracking furnace of claim 26 further comprising:
    a set of wall burners attached to the two side walls;
    a third fuel gas flow from the source of fuel gas to the wall burners having a flow rate F3;
    a steam flow at a flow rate S from the source of steam to the set of steam injection ports and emerging from the set of steam injection ports into the firebox as a set of conical steam flows, where the flow rate S is between about one-fourth and about equal to the combined flow rate F4=F1+F2+F3; and,
    a set of wall burner flames generated by fuel gas combustion at each of the set of wall burners.

33. The hydrocarbon cracking furnace of claim 32 wherein:
    the floor and roof each have an area of between about 650 ft² and 800 ft²;
    the volume of the firebox is between about 30,000 and about 40,000 ft³;
    the combined flow rate F4 is between about 8,500 lb/hr and about 11,000 lb/hr; and,
    the flow rate S is between about 0.25 F4 and 1.0 F4.

34. The hydrocarbon cracking furnace of claim 33 wherein the set of wall burners includes between 40 and 50 wall burners;
    the set of floor burners includes between 15 and 20 floor burners; and,
    each floor burner in the set of floor burners includes three primary burner tips, three secondary burner tips and two steam injection ports.

35. The hydrocarbon cracking furnace of claim 32 wherein:
    the floor and roof each have an area of between about 600 ft² and about 800 ft²;
    the volume of the firebox is between about 30,000 and about 40,000 ft³;
    the floor burners and wall burners combine to produce between about 200 MMBTU/hr and about 250 MMBTU/hr; and,
    the flow rate S is between about 0.25 F4 and about 1.0 F4.

36. The hydrocarbon cracking furnace of claim 35 wherein the set of wall burners includes between 40 and 50 wall burners;
    the set of floor burners includes between 15 and 20 floor burners; and, each floor burner in the set of floor burners includes three primary burner tips, three secondary burner tips and two steam injection ports.

37. The hydrocarbon cracking furnace of claim 32 wherein the set of wall burners comprise multiple rows of wall burners.

38. The hydrocarbon cracking furnace of claim 37 wherein there are three rows of wall burners on a first side wall of the firebox and two rows of wall burners on the opposing side wall of the firebox.

39. The hydrocarbon cracking furnace of claim 32 where the set of wall burners are distributed so that there are five wall burners for every two floor burners.

* * * * *

UNITED STATES PATENT AND TRADEMARK OFFICE
CERTIFICATE OF CORRECTION

PATENT NO. : 8,703,064 B2  
APPLICATION NO. : 13/066211  
DATED : April 22, 2014  
INVENTOR(S) : David C. Payne It is certified that error appears in the above-identified patent and that said Letters Patent is hereby corrected as shown below:

On the Title Page, Item (54) and in the Specification, Column 1, Line 1, should be:

HYDROCARBON CRACKING FURNACE WITH STEAM ADDITION TO LOWER MONO-NITROGEN OXIDE EMISSIONS.

Signed and Sealed this  
Eighth Day of July, 2014

Michelle K. Lee  
*Deputy Director of the United States Patent and Trademark Office*